United States Patent
Han et al.

(10) Patent No.: US 10,064,181 B2
(45) Date of Patent: Aug. 28, 2018

(54) SUB-BAND ALLOCATION TECHNIQUES FOR REDUCED-BANDWIDTH MACHINE-TYPE COMMUNICATION (MTC) DEVICES

(71) Applicant: INTEL IP CORPORATION, Santa Clara, CA (US)

(72) Inventors: Seunghee Han, Cupertino, CA (US); Debdeep Chatterjee, Mountain View, CA (US); Gang Xiong, Beaverton, OR (US); Elmar Wagner, Neubiberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 50 days.

(21) Appl. No.: 14/672,118

(22) Filed: Mar. 28, 2015

(65) Prior Publication Data
US 2016/0100403 A1  Apr. 7, 2016

Related U.S. Application Data

(60) Provisional application No. 62/059,745, filed on Oct. 3, 2014.

(51) Int. Cl.
*H04W 72/04* (2009.01)
*H04W 4/70* (2018.01)
(Continued)

(52) U.S. Cl.
CPC ......... *H04W 72/0453* (2013.01); *H04W 4/70* (2018.02); *H04W 72/048* (2013.01);
(Continued)

(58) Field of Classification Search
CPC . H04W 72/0453; H04W 4/005; H04W 8/186; H04W 72/0486; H04W 8/06; H04W 4/08; H04W 72/04; H04B 3/54
See application file for complete search history.

(56) References Cited

U.S. PATENT DOCUMENTS 9,344,999 B2 *  5/2016  Lee .................. H04W 72/04
9,596,683 B2 *  3/2017  Wakabayashi ........ H04L 5/0041
(Continued)

OTHER PUBLICATIONS

International Search Report and Written Opinion received for PCT Patent Application No. PCT/US2015/048118, dated Dec. 7, 2015, 13 pages.
(Continued)

*Primary Examiner* — Brian O'Connor

(57) ABSTRACT

Sub-band allocation techniques for reduced-bandwidth machine-type communication (MTC) devices are described. In one embodiment, for example, user equipment (UE) may comprise logic, at least a portion of which is in hardware, the logic to identify a machine-type communication (MTC) sub-band allocation based on received MTC sub-band allocation information, the MTC sub-band allocation to comprise an allocation of a plurality of subcarriers to an MTC sub-band of a system bandwidth of a serving cell of the UE, the MTC sub-band allocation to define at least one MTC direct current (DC) subcarrier among the plurality of subcarriers, and a radio interface to receive a transmission via the MTC sub-band according to the MTC sub-band allocation. Other embodiments are described and claimed.

22 Claims, 15 Drawing Sheets

(51) Int. Cl.
   *H04W 8/18*   (2009.01)
   *H04W 8/06*   (2009.01)
   *H04W 4/08*   (2009.01)
   *H04B 3/54*   (2006.01)

(52) U.S. Cl.
   CPC ............... *H04B 3/54* (2013.01); *H04W 4/08* (2013.01); *H04W 8/06* (2013.01); *H04W 8/186* (2013.01); *H04W 72/04* (2013.01); *H04W 72/0486* (2013.01)

(56) References Cited

U.S. PATENT DOCUMENTS

| | | | | |
|---|---|---|---|---|
| 2010/0027492 A1* | 2/2010 | Asanuma | ............ | H04L 5/0007 370/329 |
| 2010/0111005 A1* | 5/2010 | Ahn | ............ | H04L 5/0007 370/329 |
| 2012/0327894 A1 | 12/2012 | Axmon et al. | | |
| 2013/0115993 A1 | 5/2013 | Jain et al. | | |
| 2013/0322363 A1 | 12/2013 | Chen et al. | | |
| 2014/0004895 A1 | 1/2014 | Song et al. | | |
| 2014/0064067 A1 | 3/2014 | Drewes et al. | | |
| 2015/0181603 A1 | 6/2015 | Wakabayashi | | |
| 2015/0200758 A1* | 7/2015 | Wakabayashi | ............ | H04L 5/0041 370/329 |
| 2015/0281974 A1* | 10/2015 | Ghasemzadeh | ............ | H04W 16/14 455/454 |
| 2015/0365926 A1* | 12/2015 | Long | ............ | H04L 5/0094 370/329 |
| 2016/0072614 A1* | 3/2016 | Blankenship | ............ | H04L 5/0046 370/329 |
| 2016/0157231 A1* | 6/2016 | Baldemair | ............ | H04L 1/00 370/329 |

OTHER PUBLICATIONS

Office Action received for Japanese Patent Application No. 2017-517787, dated Mar. 6, 2018, 13 pages including 7 pages English translation.

* cited by examiner

Storage Medium 1300

*Computer Executable Instructions for 1100*

*FIG. 13B*

Storage Medium 1350

*Computer Executable Instructions for 1200*

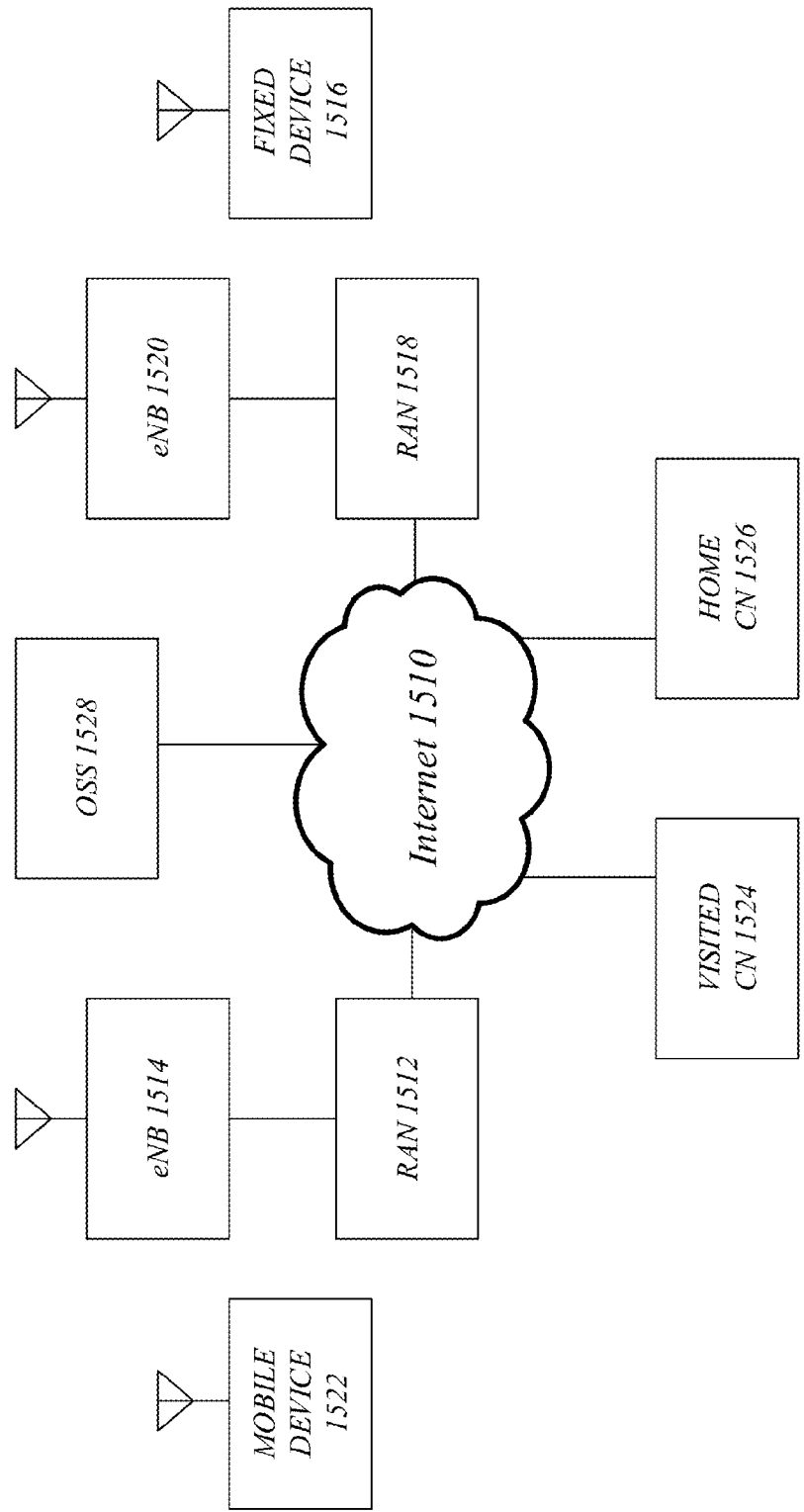

SUB-BAND ALLOCATION TECHNIQUES FOR REDUCED-BANDWIDTH MACHINE-TYPE COMMUNICATION (MTC) DEVICES

RELATED CASE

This application claims priority to U.S. Provisional Patent Application No. 62/059,745, filed Oct. 3, 2014, the entirety of which is hereby incorporated by reference.

TECHNICAL FIELD

Embodiments herein generally relate to communications between devices in broadband wireless communications networks.

BACKGROUND

With respect to broadband wireless communication networks, machine-type communication (MTC)—which generally refers to the types of typically automated wireless communications that may be performed by "userless" devices such as meters, monitors, and sensors, for example—is an emerging area of significant interest. The nature of the wireless communications performed by MTC devices may tend to differ from the nature of the wireless communications performed by non-MTC devices. With respect to non-MTC devices, downlink (DL) and/or uplink (UL) data exchanges may occur relatively frequently, the amounts of communicated data may be relatively large, realizing high data rates may be relatively important, and mobility events may be fairly common. In contrast, with respect to many MTC devices, DL and/or UL data exchanges may occur relatively infrequently, the amounts of communicated data may be relatively small, realizing high data rates may be relatively unimportant, and mobility events may be fairly uncommon. Due to the nature of typical MTC device communications, cost reduction and power conservation may be objectives of emphasis with respect to designing MTC devices and the resource allocation schemes according to which wireless channel resources are used to communicate MTC device data.

BRIEF DESCRIPTION OF THE DRAWINGS

FIG. 13A illustrates an embodiment of a first storage medium.
FIG. 13B illustrates an embodiment of a second storage medium.
FIG. 15 illustrates an embodiment of a wireless network.

DETAILED DESCRIPTION

Figure 1:
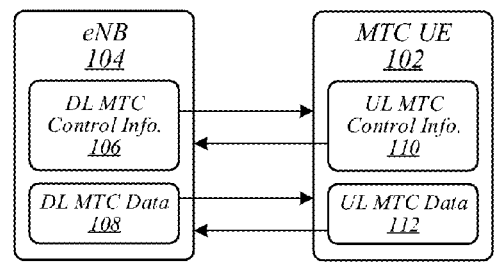
FIG. 1 illustrates an embodiment of a first operating environment.

Various embodiments may be generally directed to sub-band allocation techniques for reduced-bandwidth machine-type communication (MTC) devices. In one embodiment, for example, user equipment (UE) may comprise logic, at least a portion of which is in hardware, the logic to identify a machine-type communication (MTC) sub-band allocation based on received MTC sub-band allocation information, the MTC sub-band allocation to comprise an allocation of a plurality of subcarriers to an MTC sub-band of a system bandwidth of a serving cell of the UE, the MTC sub-band allocation to define at least one MTC direct current (DC) subcarrier among the plurality of subcarriers, and a radio interface to receive a transmission via the MTC sub-band according to the MTC sub-band allocation. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Some embodiments may more particularly involve wireless communications according to one or more MTC-related 3GPP standards, such as may be embodied, for example, in 3GPP Technical Specification (TS) 22.368 ver. 13.1.0 (2014-12) and/or 3GPP TS 23.682 ver. 13.0.0 (2014-12), including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. In operating environment 100, an MTC UE 102 is located within a cell 103, which is generally served by an eNB 104. In some embodiments, cell 103 may comprise a cell of an Evolved Universal Mobile Telecommunications System Terrestrial Radio Access Network (E-UTRAN). In various embodiments, eNB 104 may transmit downlink (DL) MTC control information 106 and/or DL MTC data 108 to MTC UE 102 using subcarriers comprised in a system bandwidth for eNB 104. In some embodiments, MTC UE 102 may transmit uplink (UL) MTC control information 110 and/or UL MTC data 112 to eNB 104 using subcarriers comprised in the system bandwidth for eNB 104. The embodiments are not limited in this context.

Figure 2:
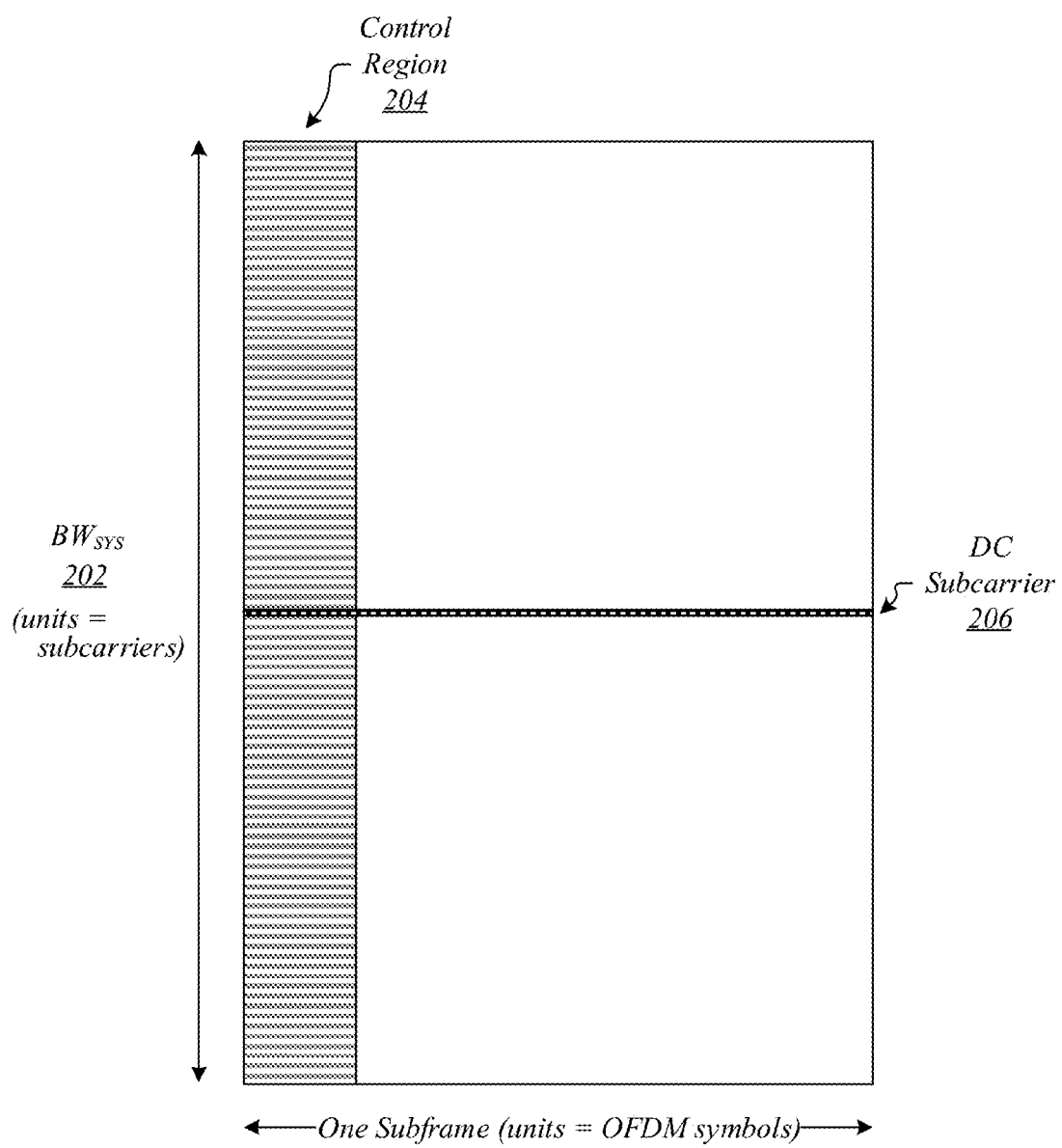
FIG. 2 illustrates an embodiment of a wireless resource grid.

FIG. 2 illustrates an example of a wireless resource grid 200 that may be representative of wireless resources associated with the system bandwidth for eNB 104 of FIG. 1 in various embodiments. More particularly, wireless resource grid 200 may be representative of the wireless resources comprised in the system bandwidth for eNB 104 during a given subframe. As shown in FIG. 2, in the horizontal dimension, wireless resource grid 200 comprises a series of orthogonal frequency-division multiplexing (OFDM) symbols that collectively comprise one subframe. In the vertical dimension, wireless resource grid 200 comprises a plurality of subcarriers that collectively comprise a system bandwidth ($BW_{SYS}$) 202. In some embodiments, $BW_{SYS}$ 202 may comprise a system bandwidth for a device that is responsible for allocating the wireless resources of wireless resource grid 200. In various embodiments, $BW_{SYS}$ 202 may comprise a system bandwidth for eNB 104 of FIG. 1. The embodiments are not limited in this context.

In some embodiments, some of the wireless resources within wireless resource grid 200 may be designated for use in transmission of control messages. For example, in various embodiments, the wireless resources within a control region 204 may be designated for use in control message transmissions, where the control region 204 comprises the respective resource elements (REs) of each subcarrier during an certain number of initial OFDM symbols at the beginning of the subframe that wireless resource grid 200 spans. In some embodiments, a substantially central subcarrier among the plurality of subcarriers in $BW_{SYS}$ 202 may be defined as a direct current (DC) subcarrier 206. In various embodiments, DC subcarrier 206 may comprise a subcarrier that is not actually used when transmission is performed over $BW_{SYS}$ 202. In some/var embodiments, DC subcarrier 206 may be implemented in order to mitigate DC offset issues that can arise at direct-conversion receivers when they convert RF signals received via $BW_{SYS}$ 202 to baseband. The embodiments are not limited in this context.

In some embodiments, when an eNB uses resources of wireless resource grid 200 to transmit control information or data to UEs in its cell, it may be able to use all of the subcarriers of system bandwidth 204 for that purpose. In various embodiments, if the eNB is permitted to use any particular set of subcarriers of its choosing to exchange control information or data with a given UE, then that UE may need to be able to communicate using each of the plurality subcarriers comprised in $BW_{SYS}$ 202, so that it can access any particular subcarrier that the eNB may allocate for its communications during any particular timeframe.

As mentioned above, cost reduction and power conservation may be objectives of emphasis with respect to designing MTC devices and the resource allocation schemes according to which wireless channel resources are used to communicate MTC device data. As such, in some embodiments, it may be desirable to configure MTC UEs to communicate using a reduced bandwidth that is smaller than the typical system bandwidths of cells by which they may be served. For example, it may be desirable to configure MTC UEs to use a reduced bandwidth of 1.4 MHz, corresponding to the defined minimum LTE system bandwidth. In various embodiments, implementing such a reduced bandwidth may reduce power consumption at MTC UEs, because they may not be required to monitor as many subcarriers. In some embodiments, implementing such a reduced bandwidth may also enable reduction and/or simplification of signal processing circuitry of MTC UEs, which in turn may enable reduction in the costs of MTC UEs. The embodiments are not limited in this context.

Figure 3:
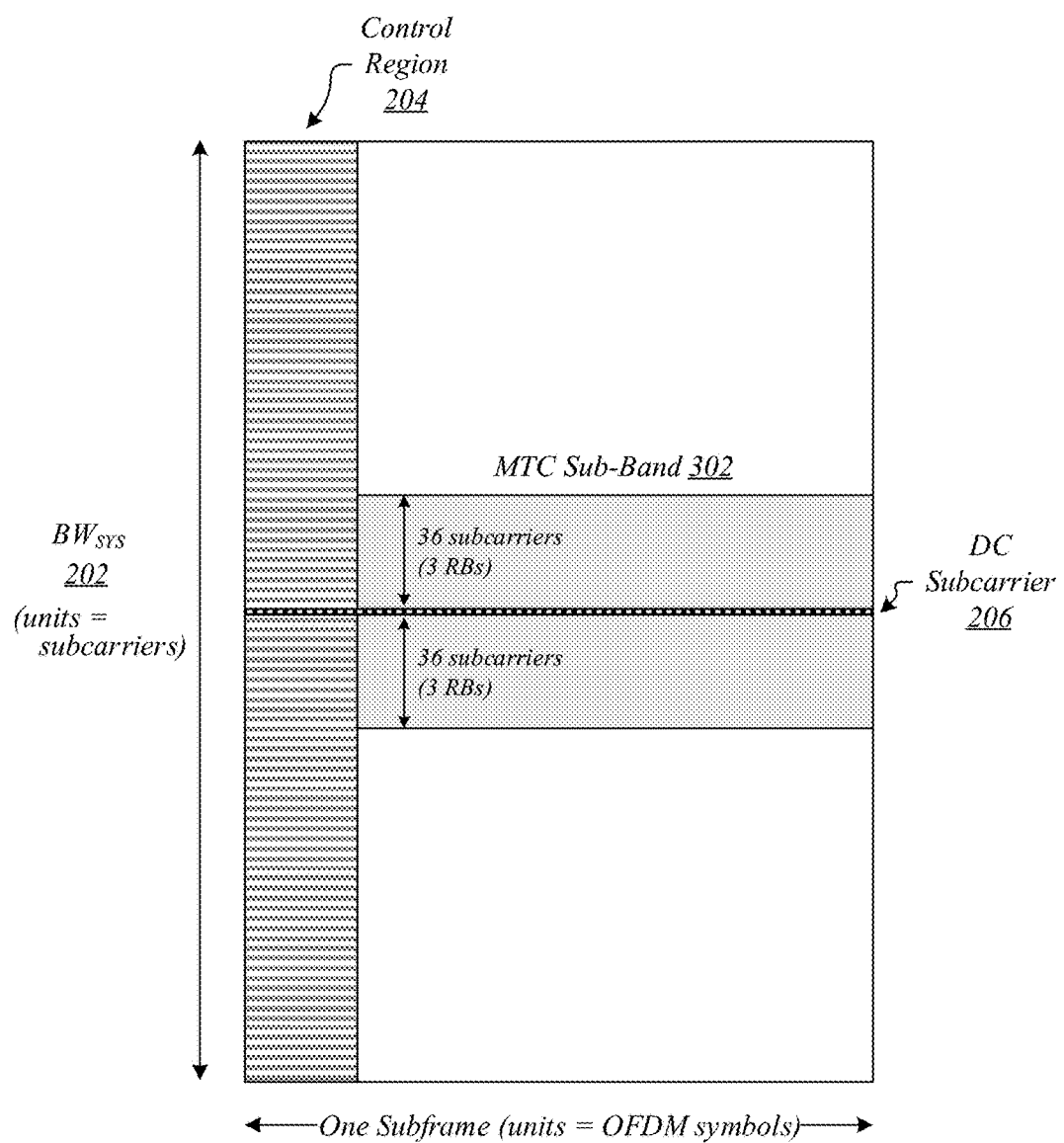
FIG. 3 illustrates an embodiment of a first wireless resource allocation.

FIG. 3 illustrates an example of a wireless resource allocation 300 that may be representative of the implementation of sub-band allocation techniques for reduced-bandwidth MTC devices in various embodiments. According to wireless resource allocation 300, an MTC sub-band 302 is defined that comprises a subset of the subcarriers within $BW_{SYS}$ 202. More particularly, MTC sub-band 302 comprises DC subcarrier 206 and the 36 respective contiguous subcarriers on either side of DC subcarrier 206. As reflected in FIG. 3, a resource block (RB) may comprise a bandwidth of 12 subcarriers, and thus MTC sub-band 302 may comprise DC subcarrier 206 and the three respective contiguous RBs on either side of DC subcarrier 206. In other words, MTC sub-band 302 may comprise the six central resource blocks of $BW_{SYS}$ 202, as well as DC subcarrier 206. In some embodiments, with respect to DL transmissions, MTC sub-band 302 may be defined only during the OFDM symbols that follow control region 204, and control region 204 may be preserved in order to achieve seamless coexistence between existing protocols and MTC protocols making use of reduced MTC bandwidths. The embodiments are not limited in this context.

According to various sub-band allocation techniques for reduced-bandwidth MTC devices, an eNB may be configured to define multiple MTC sub-bands within its system bandwidth in order to provide support for the use of reduced bandwidths by greater numbers of MTC UEs. In some embodiments, each MTC sub-band may comprise substantially the same bandwidth as the reduced bandwidths of the MTC UEs. In various embodiments, an eNB may be permitted to define overlapping MTC sub-bands, such that multiple MTC sub-bands may comprise a same particular subcarrier. In some other embodiments, MTC sub-bands may be required to be disjoint, such that any particular subcarrier may be comprised in at most one MTC sub-band. The embodiments are not limited in this context.

Figure 4:
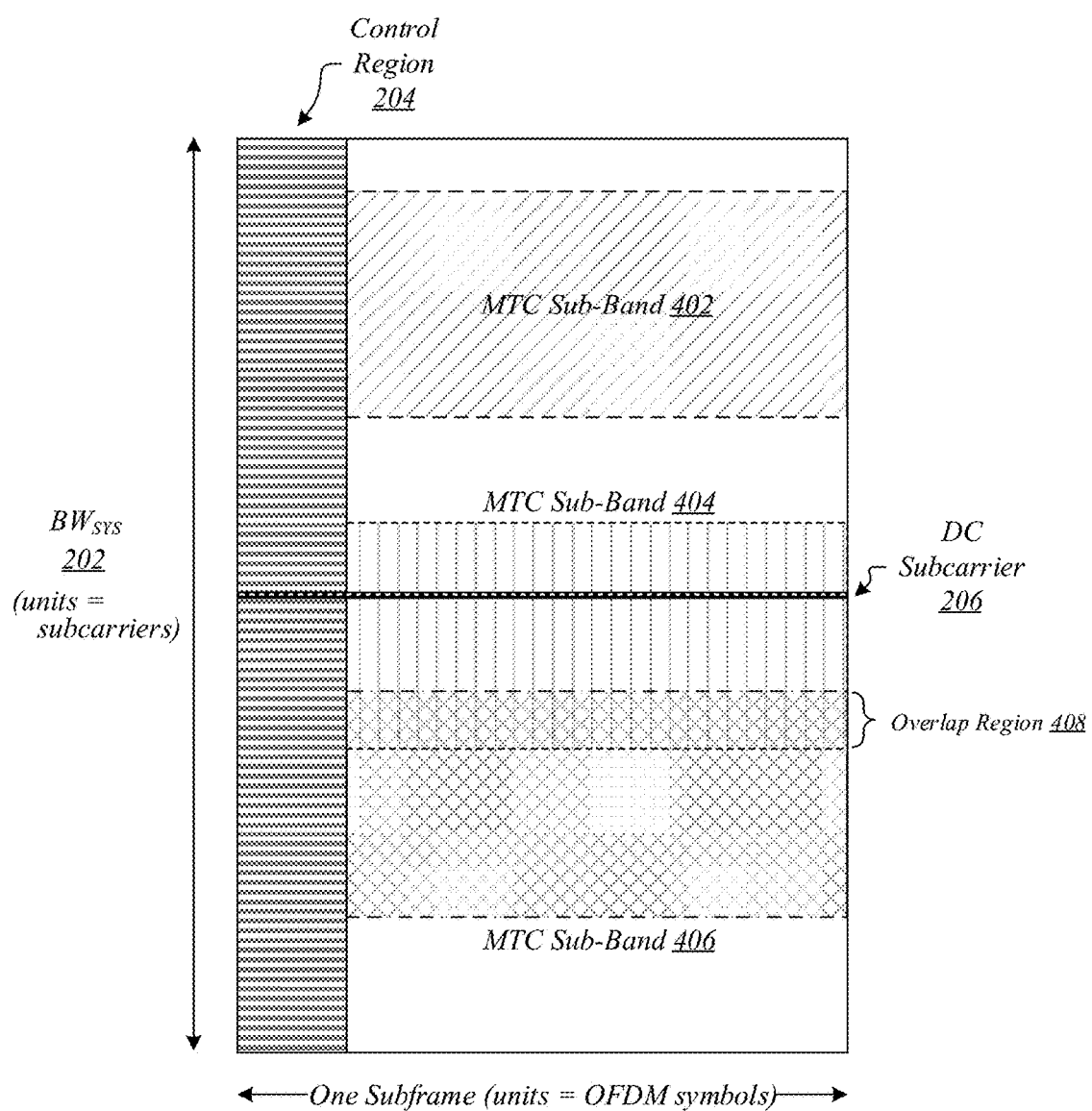
FIG. 4 illustrates an embodiment of a second wireless resource allocation.

FIG. 4 illustrates an example of a wireless resource allocation 400 that may be representative of the implementation of sub-band allocation techniques for reduced-bandwidth MTC devices in various embodiments. More particularly, wireless resource allocation 400 may be representative of some embodiments in which MTC sub-bands are permitted to overlap. According to wireless resource allocation 400, three MTC sub-bands 402, 404, and 406 are defined within $BW_{SYS}$ 202. While MTC sub-band 402 is disjoint with respect to MTC sub-bands 404 and 406, MTC sub-bands 404 and 406 overlap each other in an overlap region 408. MTC sub-bands 402 and 406 do not contain DC subcarrier 206. MTC sub-band 404 contains DC subcarrier 206, but DC subcarrier 206 is not a substantially central within MTC sub-band 404. The embodiments are not limited to this example.

Figure 5:
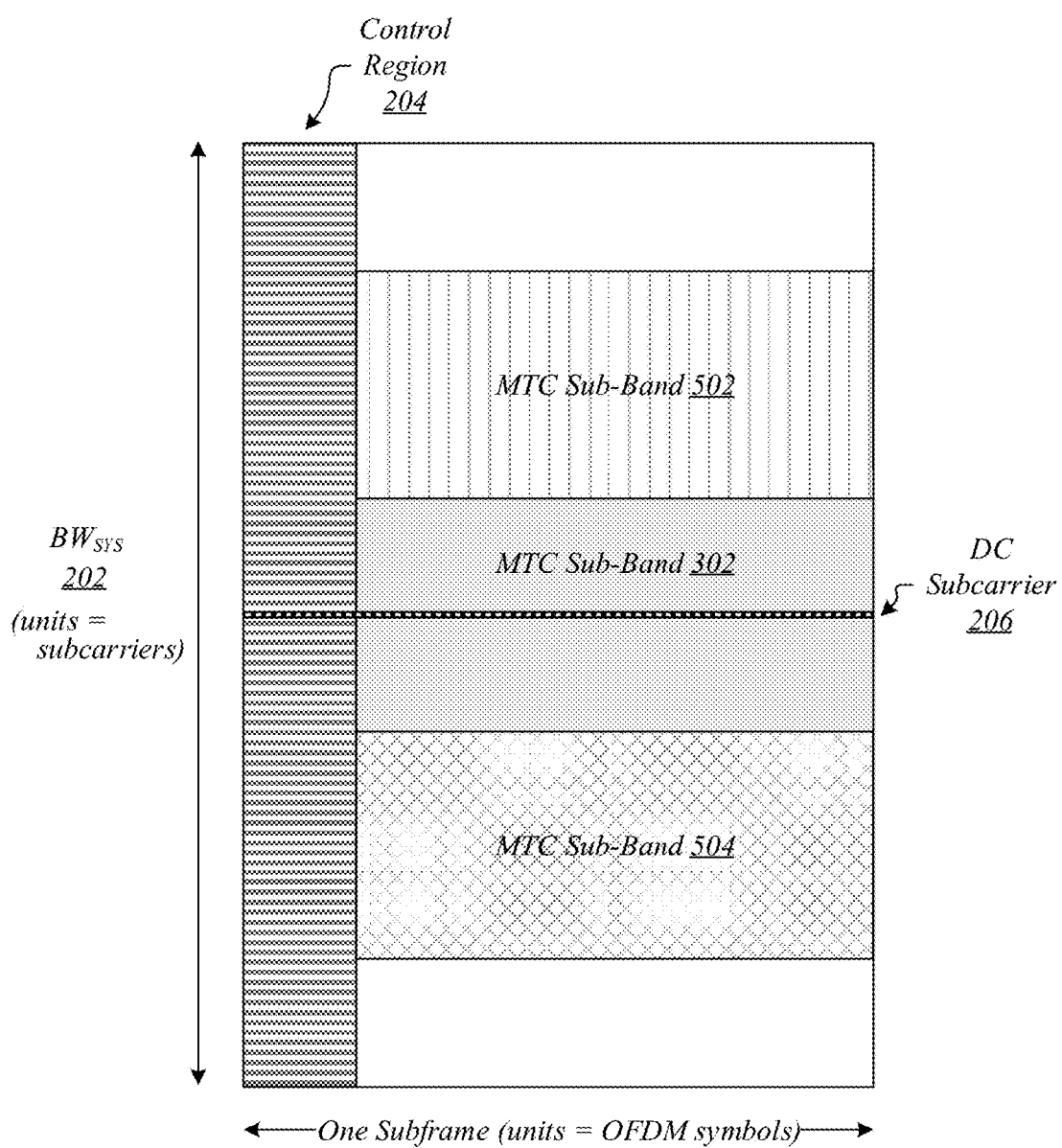
FIG. 5 illustrates an embodiment of a third wireless resource allocation.

FIG. 5 illustrates an example of a wireless resource allocation 500 that may be representative of the implementation of sub-band allocation techniques for reduced-bandwidth MTC devices in various embodiments. More particularly, wireless resource allocation 500 may be representative of some embodiments in which MTC sub-bands are required to be disjoint. Wireless resource allocation 500 includes MTC sub-band 302 of FIG. 3, which may comprise DC subcarrier 206 and the three respective contiguous RBs on either side of DC subcarrier 206. Wireless resource allocation 500 also defines MTC sub-bands 502 and 504, both of which are disjoint with respect to the other and with respect MTC sub-band 302. MTC sub-band 302 contains DC subcarrier 206, and DC subcarrier 206 is substantially central within MTC sub-band 302. MTC sub-bands 502 and 504 do not contain DC subcarrier 206. In the example of wireless resource allocation 500, MTC sub-band 502 may be regarded as being adjacent to MTC sub-band 302, and MTC sub-band 302 may be regarded as being adjacent to MTC sub-band 504, in the sense that there are no unallocated subcarriers between these respective pairs of sub-bands. However, it is worthy of note that a requirement that MTC sub-bands be disjoint need not necessarily require that they be adjacent, and in various embodiments, a wireless resource allocation may be implemented that defines non-adjacent disjoint MTC sub-bands. The embodiments are not limited in this context.

Figure 6:
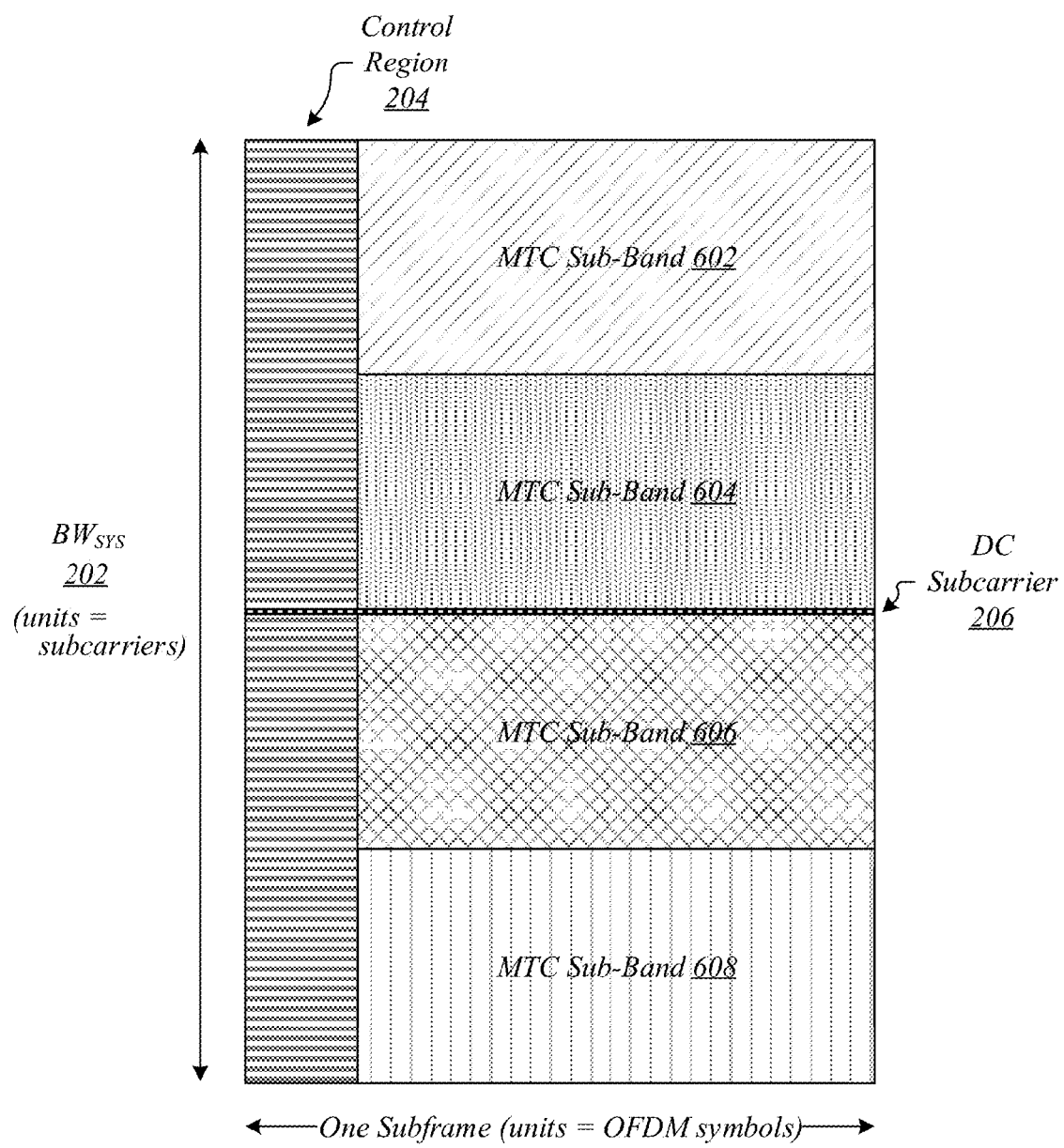
FIG. 6 illustrates an embodiment of a fourth wireless resource allocation.

FIG. 6 illustrates an example of a wireless resource allocation 600 that may be representative of the implementation of sub-band allocation techniques for reduced-bandwidth MTC devices in some embodiments. More particularly, wireless resource allocation 600 may be representative of various embodiments in which a wireless resource allocation is implemented according to which none of multiple defined MTC sub-bands comprise the DC subcarrier for the system bandwidth within which they are defined. In the example of FIG. 6, the size of $BW_{SYS}$ 202 may be such that it comprises precisely enough subcarriers to enable the definition of four disjoint MTC sub-bands within $BW_{SYS}$ 202. Namely, two disjoint but adjacent MTC sub-bands 602 and 604 may be defined on one side of DC subcarrier 206, and two disjoint but adjacent MTC sub-bands 606 and 608 may be defined on the other side of DC subcarrier 206. In some embodiments, an advantage associated with wireless resource allocation 600 relative to wireless resource allocation 500 of FIG. 5 may be that wireless resource allocation 600 fits four disjoint MTC sub-bands into $BW_{SYS}$ 202, while wireless resource allocation 500 fits only three. However, while one of the MTC sub-bands defined by wireless resource allocation 500 comprises a substantially central DC subcarrier, none of the MTC sub-bands defined by wireless resource allocation 600 comprise substantially central DC subcarriers. The embodiments are not limited to this example.

In various embodiments, for substantially the same reasons that it may be desirable for a system bandwidth such as $BW_{SYS}$ 202 of FIGS. 2-5 to comprise a substantially central DC subcarrier such as DC subcarrier 206, it may be desirable for any given MTC sub-band to comprise a substantially central DC subcarrier. However, as illustrated in the preceding examples, in some embodiments, a substantially central DC subcarrier for a system bandwidth may not be substantially central to—or even contained within—one or more MTC sub-bands that are defined within that system bandwidth. As such, according to the disclosed sub-band allocation techniques for reduced-bandwidth MTC devices in various embodiments, one or more MTC DC subcarriers may be defined among a plurality of subcarriers in a given MTC sub-band.

Figure 7:
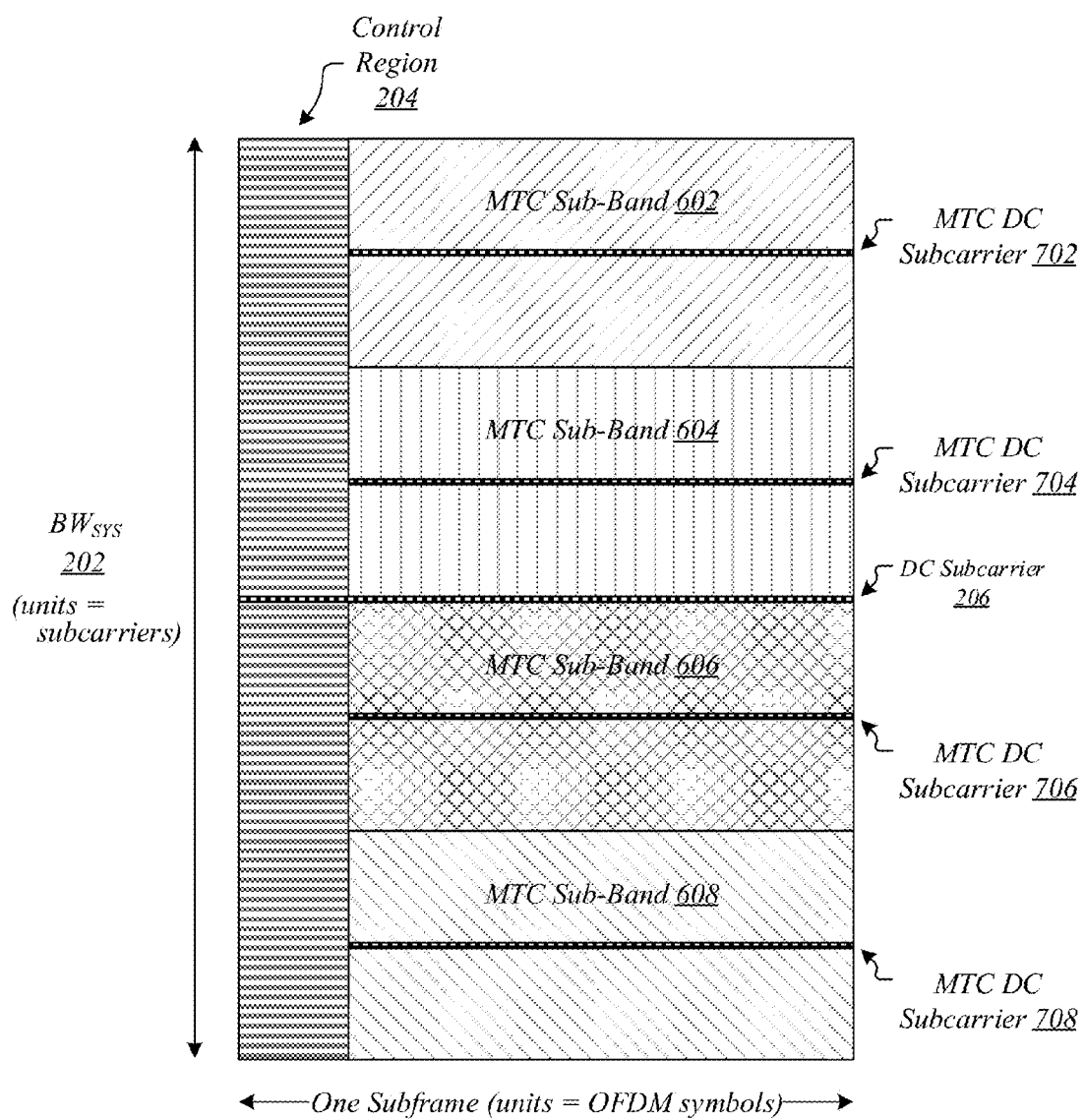
FIG. 7 illustrates an embodiment of a fifth wireless resource allocation.

FIG. 7 illustrates an example of a wireless resource allocation 700 that may be representative of the implementation of sub-band allocation techniques for reduced-bandwidth MTC devices in some embodiments. More particularly, wireless resource allocation 700 may be representative of various embodiments in which a respective MTC DC subcarrier is defined within each of a plurality of disjoint MTC sub-bands. As shown in FIG. 7, wireless resource allocation 700 defines the same MTC sub-bands 602, 604, 606, and 608 as does wireless resource allocation 600 of FIG. 6. However, according to wireless resource allocation 700, respective substantially-central subcarriers within MTC sub-bands 602, 604, 606, and 608 are defined as MTC DC subcarriers 702, 704, 706, and 708. In some embodiments, multiple respective substantially-central MTC DC subcarriers may be defined for any particular MTC sub-band. In an example, rather than a single MTC DC subcarrier 702 being defined for MTC sub-band 602, each of three substantially-central subcarriers within MTC sub-band 602 may be defined to be MTC DC subcarriers. The embodiments are not limited to this example.

It is worthy of note that in various embodiments, as reflected in wireless resource allocation 700, the definition of MTC DC subcarriers may apply only during the OFDM symbols that follow those of control region 204. In some embodiments, confining the defined MTC DC subcarriers to the OFDM symbols following control region 204—and thus preserving the legacy usage of those subcarriers during control region 204—may minimize the impact on legacy devices in conjunction with implementation of the disclosed sub-band allocation techniques for reduced-bandwidth MTC devices. The embodiments are not limited in this context.

Figure 8:
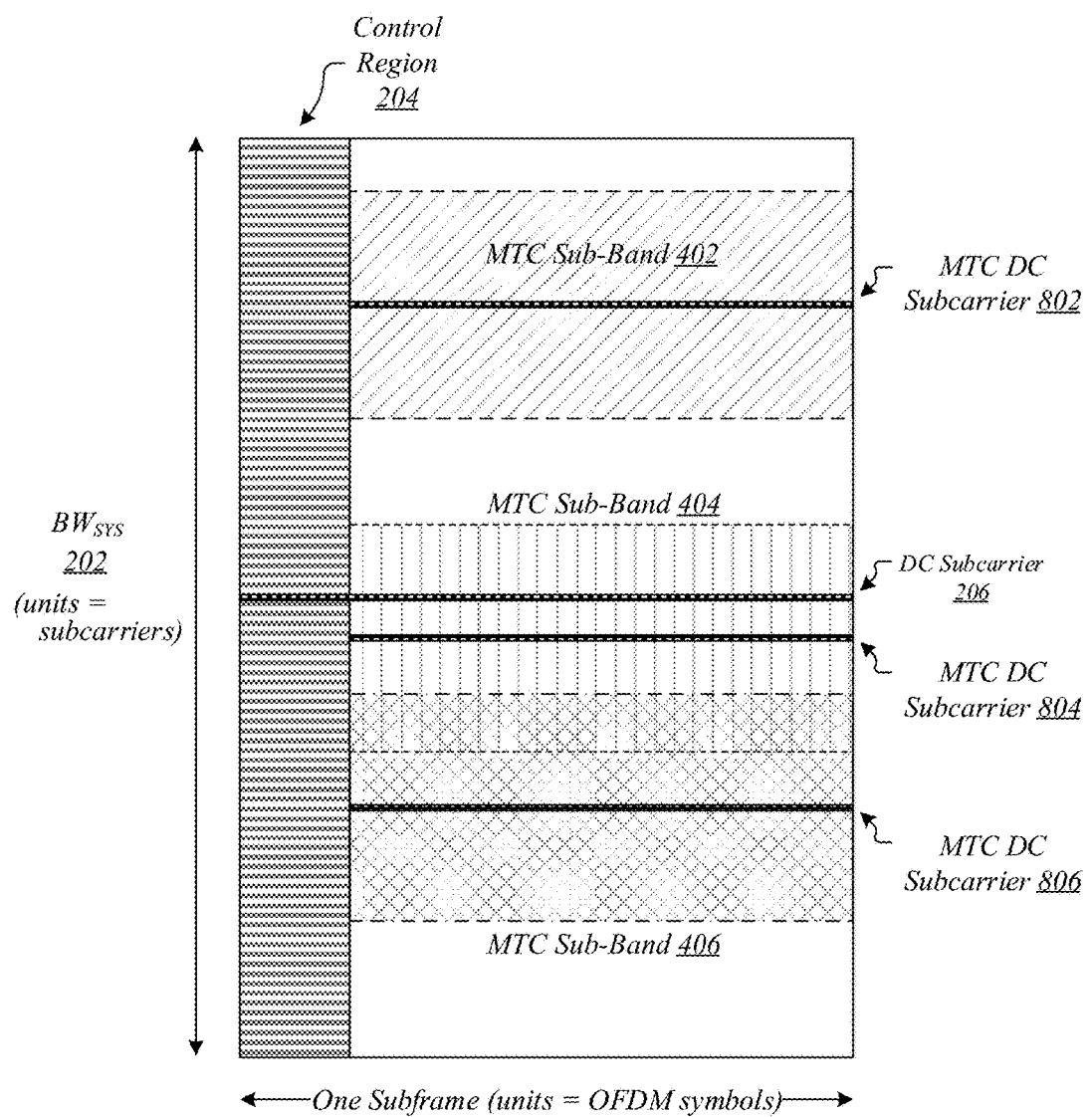
FIG. 8 illustrates an embodiment of a sixth wireless resource allocation.

FIG. 8 illustrates an example of a wireless resource allocation 800 that may be representative of the implementation of sub-band allocation techniques for reduced-bandwidth MTC devices in various embodiments. More particularly, wireless resource allocation 800 may be representative of some embodiments in which a respective MTC DC subcarrier is defined within each of a plurality of MTC sub-bands that includes overlapping MTC sub-bands. As shown in FIG. 8, wireless resource allocation 800 defines the same MTC sub-bands 402, 404, and 406 as does wireless resource allocation 400 of FIG. 4. However, according to wireless resource allocation 800, respective substantially-central subcarriers within MTC sub-bands 402, 404, and 406 are defined as MTC DC subcarriers 802, 804, and 806. As previously noted, in various embodiments, multiple respective substantially-central MTC DC subcarriers may be defined for any particular MTC sub-band. Thus, for example, rather than a single MTC DC subcarrier 802 being defined for MTC sub-band 402, each of three substantially-central subcarriers within MTC sub-band 402 may be defined to be MTC DC subcarriers. The embodiments are not limited to this example.

It is worthy of note that in some embodiments, as reflected in wireless resource allocation 800, one or more MTC DC subcarriers may be defined within an MTC sub-band that also comprises a DC subcarrier for the system bandwidth. For example, according to wireless resource allocation 800, a substantially-central subcarrier within MTC sub-band 404 is defined as an MTC DC subcarrier 804 while another, non-central subcarrier within MTC sub-band 404 is defined as the DC subcarrier 206 for $BW_{SYS}$ 202. In various embodiments, both DC subcarrier 206 and MTC DC subcarrier 804 may be handled as DC subcarriers in conjunction with transmission/reception over MTC sub-band 404. In some other embodiments, only MTC DC subcarrier 804 may be handled as a DC subcarrier in conjunction with transmission/reception over MTC sub-band 404. The embodiments are not limited in this context.

In various embodiments, an eNB that defines one or more MTC sub-bands within its system bandwidth may allocate bandwidth to those MTC sub-bands based on a minimum system bandwidth according to a legacy protocol. For example, an eNB may allocate bandwidth to MTC sub-bands based on a defined minimum LTE system bandwidth of 1.4 MHz. In some embodiments, according to the legacy protocol, the minimum system bandwidth may comprise a central DC subcarrier, such as DC subcarrier 206, and a certain number of resource blocks (in the frequency dimension) on either side of the central DC subcarrier. For example, an LTE system bandwidth of 1.4 MHz may comprise a central DC subcarrier and three resource blocks (in the frequency dimension) on either side of the central DC subcarrier. In various embodiments, an eNB that allocates bandwidth to MTC sub-bands based on a minimum system bandwidth of a legacy protocol may allocate a same number of contiguous resource blocks to each MTC sub-band as the number of resource blocks that are comprised in the minimum system bandwidth according to the legacy protocol. For example, based on a minimum LTE system bandwidth of 1.4 MHz that comprise three resource blocks on either side of a central DC subcarrier, an eNB may define each MTC sub-band as six contiguous resource blocks in the frequency dimension. In some embodiments, an MTC sub-band that is defined in such a manner may comprise a different number of subcarriers than the minimum system bandwidth of the legacy protocol.

Figure 9:
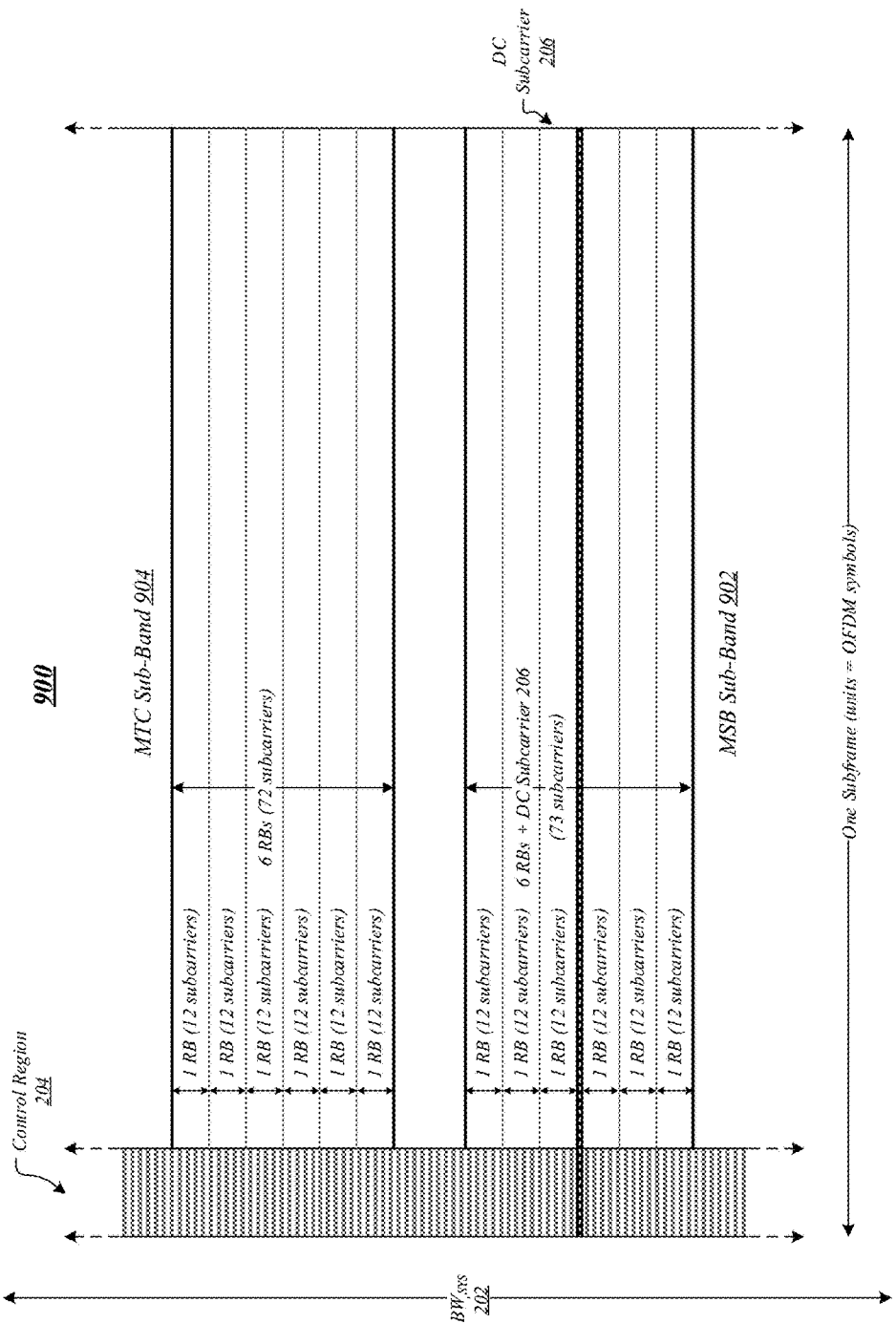
FIG. 9 illustrates an embodiment of a seventh wireless resource allocation.

FIG. 9 illustrates an example of a wireless resource allocation 900 that may be representative of such an embodiment. In FIG. 9, a minimum system bandwidth (MSB) sub-band 902 is depicted that represents the wireless resources that are used for communications according to a minimum system bandwidth of a legacy protocol. In various embodiments, MSB sub-band 902 may be representative of the wireless resources to be used for communications according to a minimum LTE system bandwidth of 1.4 MHz. As shown in FIG. 9, in the frequency dimension, MSB sub-band 902 comprises central DC subcarrier 206 as well a total of six resource blocks, three on either side of central DC subcarrier 206. Each resource block comprises 12 subcarriers, and thus MSB sub-band 902 comprises 72 usable subcarriers as well as one DC subcarrier, or a total of 73 subcarriers. An MTC sub-band 904 is defined that also comprises six resource blocks. More particularly, MTC sub-band 904 comprises six contiguous resource blocks. Unlike MSB sub-band 902, MTC sub-band 904 does not comprise DC subcarrier 206, and MTC sub-band 904 thus comprises only 72 total subcarriers instead of 73. If one or more MTC DC subcarriers are defined within MTC sub-band 904, then the number of usable subcarriers in MTC sub-band 904 will be less than 72—namely, the number of usable subcarriers in MTC sub-band 904 will be 72 minus the number of MTC DC subcarriers that are defined within MTC sub-band 904. It is worthy of note that in some embodiments, 1.4 MHz may be allocated for a given MTC sub-band rather than six contiguous resource blocks. In various such embodiments, one MTC DC subcarrier may be defined within that MTC sub-band, and the number of usable subcarriers in that MTC sub-band may in fact be equal to 72. The embodiments are not limited in this context.

Figure 10:
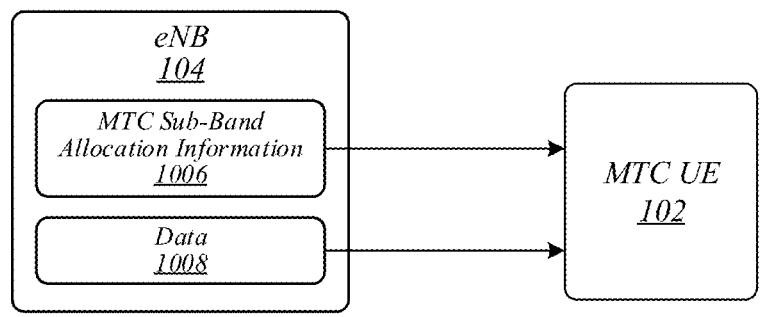
FIG. 10 illustrates an embodiment of a second operating environment.

FIG. 10 illustrates an example of an operating environment 1000 that may be representative of some embodiments in which MTC UE 102 and eNB 104 of FIG. 1 implement sub-band allocation techniques for reduced-bandwidth MTC devices. In operating environment 1000, one or more MTC sub-bands may be defined within a system bandwidth of eNB 104. In various embodiments, each MTC sub-band may be defined by a respective MTC sub-band allocation. In some embodiments, each MTC sub-band allocation may comprise an allocation of a plurality of subcarriers to a respective MTC sub-band. In various embodiments, any particular MTC sub-band allocation may define one or more MTC DC subcarriers among the plurality of subcarriers in its respective MTC sub-band. In some embodiments, eNB 104 may send MTC sub-band allocation information 1006 in order to enable MTC UE 102 to identify any particular MTC sub-band allocation.

In various embodiments, any particular MTC sub-band allocation may comprise an allocation that is predefined for the system bandwidth being used by eNB 104. In some embodiments, the MTC sub-band allocation information 1006 that eNB 104 sends in order to notify MTC UE 102 of such a predefined allocation may simply comprise a system bandwidth parameter that indicates the system bandwidth of eNB 104. In various embodiments, for example, eNB 104 may notify MTC UE 102 of a given MTC sub-band allocation by including a system bandwidth parameter indicating its system bandwidth in a master information block (MIB). It is worthy of note that in some such embodiments, the system bandwidth parameter may comprise a legacy parameter that eNB 104 includes in the MIB irrespective of whether it is implementing sub-band allocation techniques for reduced-bandwidth MTC devices. The embodiments are not limited in this context.

In various embodiments, any particular MTC sub-band allocation may be semi-statically configured by eNB 104. For example, in some embodiments, eNB 104 may semi-statically configure a given MTC sub-band allocation to span a certain number of subframes or to apply to a certain set of subframes within each radio frame. In various embodiments, the MTC sub-band allocation information 1006 that eNB 104 sends in order to notify MTC UE 102 of such a semi-static allocation may comprise one or more parameters that eNB 104 includes in a system information block (SIB). In an example, eNB 104 may include an MTC allocation duration parameter in an SIB in order to specify a number of subframes during which a semi-static MTC sub-band allocation applies during each radio frame. In another example, eNB 104 may include an MTC allocation subframe bitmap in an SIB in order to indicate one or more subframes to which the MTC sub-band allocation applies during each radio frame. In some embodiments, a legacy SIB may be enhanced for use to convey MTC sub-band allocation information 1006 for semi-static MTC sub-band allocations. In various other embodiments, a new SIB may be defined for use to convey MTC sub-band allocation information 1006 for semi-static MTC sub-band allocations. The embodiments are not limited in this context.

In some embodiments, any particular MTC sub-band allocation may be dynamically configured by eNB 104. For example, in various embodiments, eNB 104 may dynamically configure an MTC sub-band allocation for a given radio frame. In some embodiments, eNB 104 may use layer 1 signaling to provide MTC UE 102 with MTC sub-band allocation information 1006 for a dynamically-configured MTC sub-band allocation. In various embodiments, eNB 104 may provide MTC UE 102 with MTC sub-band allocation information 1006 for a dynamically-configured MTC sub-band allocation by including the MTC sub-band allocation information 1006 in a radio resource control (RRC) message that it sends to MTC UE 102. In some embodiments, the MTC sub-band allocation information 1006 that eNB 104 sends to MTC UE 102 may specify particular resources of the MTC sub-band that have been allocated for use by MTC UE 102. The embodiments are not limited in this context.

In various embodiments, each MTC sub-band may comprise a same predefined size and number of MTC DC subcarriers. In some such embodiments, eNB 104 may notify MTC UE 102 of a particular MTC sub-band allocation by sending MTC sub-band allocation information 1006 that simply comprises a starting frequency location for the allocated MTC sub-band. In various embodiments, MTC UE 102 may identify the subcarriers comprised in an allocated MTC sub-band, and the MTC DC subcarriers among them, based on received MTC sub-band allocation information 1006 indicating the starting frequency location for that MTC sub-band and on a known defined MTC sub-band size and MTC DC subcarrier count. The embodiments are not limited in this context.

In some embodiments, after sending MTC sub-band allocation information 1006 to notify MTC UE 102 of an allocation of a given MTC sub-band, eNB 104 may send data 1008 to MTC UE 102 using that MTC sub-band. More particularly, eNB 104 may transmit a signal comprising that data 1008 to MTC UE 102 over the MTC sub-band. As noted above with respect to wireless resource allocation 900 of FIG. 9, in various embodiments, an MTC sub-band that is defined to substantially correspond in size to a minimum system bandwidth of a legacy protocol may comprise a different number of subcarriers than are to be used to communicate over that minimum system bandwidth according to the legacy protocol. As such, in some embodiments, MTC UE 102 may receive the signal comprising data 1008 via a different number of subcarriers than it would receive a signal transmitted over the minimum system bandwidth. For example, while it may be configured to receive transmissions over a minimum LTE system bandwidth of 1.4 MHz via 73 subcarriers, MTC UE 102 may receive the signal comprising data 1008 via only 72 subcarriers. The embodiments are not limited to this example.

In various embodiments, eNB 104 may generate an encoded bit stream based on data 1008, generate a modulated symbol stream based on the encoded bit stream, generate a signal based on the modulated symbol stream, and transmit the signal to MTC UE 102 over an MTC sub-band. In some embodiments, eNB 104 may account for the definition of one or more MTC DC subcarriers within the MTC sub-band during the process of generating that signal.

In various embodiments, eNB 104 may account for the one or more MTC DC subcarriers in conjunction with applying rate-matching to the encoded bit stream prior to modulation. In some such embodiments, eNB 104 may perform rate-matching according to which the resource elements (REs) of MTC DC subcarriers are excluded for the purpose of calculating the number of encoded bits to be obtained by the rate-matching. In various embodiments, eNB 104 may apply puncturing for subframes during which legacy transmissions collide on the MTC DC subcarriers. Examples of such legacy transmissions may include, without limitation, reference signals such as cell-specific reference signals (CRSs) channel state information reference signals (CSI-RSs), and demodulation reference signals (DM-RSs). In some embodiments, following rate-matching, eNB 104 may perform modulation to generate a modulated symbol stream and generate the signal comprising data 1008 based on the modulated symbol stream. The embodiments are not limited in this context.

In various other embodiments, eNB 104 may account for the one or more MTC DC subcarriers following modulation. In some such embodiments, eNB 104 may perform rate-matching according to which the REs of MTC DC subcarriers are included for the purpose of calculating the number of encoded bits to be obtained by the rate-matching. In various embodiments, eNB 104 may then perform modulation to generate a modulated symbol stream, perform symbol puncturing on the symbols corresponding to the MTC DC subcarriers to obtain a punctured modulated symbol stream, and generate the signal comprising data 1008 based on the punctured modulated symbol stream. In some embodiments, eNB 104 may apply puncturing for subframes during which legacy transmissions collide on the MTC DC subcarriers. Examples of such legacy transmissions may include, without limitation, reference signals such as CRSs, CSI-RSs, and DM-RSs. The embodiments are not limited in this context.

In various embodiments, it may be desirable for eNB 104 to switch an MTC sub-band assignment for MTC UE 102 from one MTC sub-band to another. In some embodiments, each time that the MTC sub-band assignment for MTC UE 102 changes, MTC UE 102 may need to perform receive retuning before it can begin receiving transmissions over the newly assigned MTC sub-band. The amount of time that it takes MTC UE 102 to complete receive retuning for a newly assigned MTC sub-band may be referred to as the retuning time for the newly assigned MTC sub-band. The amount of time that elapses between assignment of the new MTC sub-band and a subsequent assignment of a different MTC sub-band may be referred to as the assignment duration for the newly assigned MTC sub-band.

With respect to any given MTC sub-band that may be assigned to MTC UE 102, the larger the retuning time is relative to the assignment duration, the larger the fraction of the assignment duration that is wasted, in the sense that the assigned MTC sub-band cannot actually be used during the retuning time. As such, in various embodiments, eNB 104 may be configured to observe a minimum switching time with respect to MTC sub-band assignments for any particular UE such as MTC UE 102. In some embodiments, eNB 104 may be configured to observe minimum switching times both with respect to resource allocations for unicast and broadcast DL transmissions and with respect to resource allocations for unicast UL transmissions. For example, in various embodiments, eNB 104 may assign MTC sub-bands to MTC UE 102 in such fashion that MTC UE 102 will be associated with any particular assigned DL or UL MTC sub-band for at least a minimum switching time. In some embodiments, eNB 104 may allocate MTC sub-band resources with a degree of granularity in the time dimension that matches the minimum switching time. For example, in various embodiments in which the minimum switching time is one radio frame, eNB 104 may allocate MTC sub-band resources on a radio frame-by-radio frame basis. The embodiments are not limited to this example.

In some embodiments, such as in the preceding example, a minimum switching time of one radio frame may be implemented. In various other embodiments, the minimum switching time may comprise an integer number of radio frames that is greater than one. In yet other embodiments, the minimum switching time may comprise a positive integer number of subframes or OFDM symbols. In still other embodiments, the minimum switching time may be defined according to some other time units, and may or may not comprise an integer number of those time units. In some embodiments, a given defined minimum switching time may be specific to a particular UE, a particular group of UEs, a particular MTC sub-band, or a particular group of MTC sub-bands. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 11:
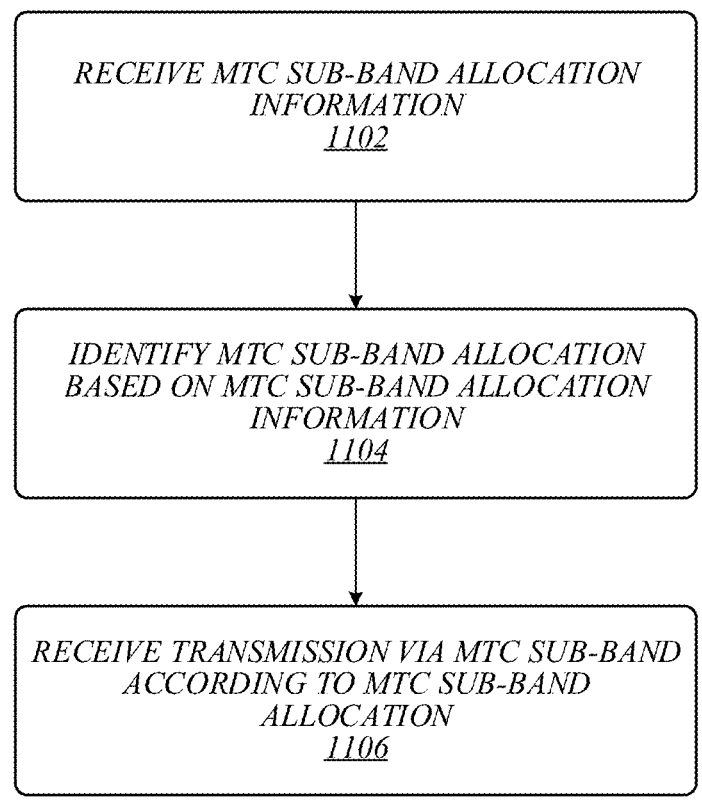
FIG. 11 illustrates an embodiment of a first logic flow.

FIG. 11 illustrates an example of a logic flow 1100 that may be representative of operations that may be performed in conjunction with the implementation of sub-band allocation techniques for reduced-bandwidth MTC devices in various embodiments. For example, logic flow 1100 may be representative of operations that may be performed in some embodiments by MTC UE 102 in operating environment 1000 of FIG. 10. As shown in FIG. 11, MTC sub-band allocation information may be received at 1102. For example, in operating environment 1000 of FIG. 10, MTC UE 102 may receive MTC sub-band allocation information 1006 from eNB 104. At 1104, an MTC sub-band allocation may be identified based on the MTC sub-band allocation information. In various embodiments, the MTC sub-band allocation may comprise an allocation of a plurality of subcarriers to an MTC sub-band of a system bandwidth, and may define at least one MTC DC subcarrier among that plurality of subcarriers. For example, in operating environment 1000 of FIG. 10, MTC UE 102 may identify an MTC sub-band allocation based on received MTC sub-band allocation information 1006, and the MTC sub-band allocation may comprise an allocation of a plurality of subcarriers to an MTC sub-band of a system bandwidth of eNB 104, and may define at least one MTC DC subcarrier among that plurality of subcarriers. At 1106, a transmission may be received via an MTC sub-band according to the MTC sub-band allocation. For example, in operating environment 1000 of FIG. 10, MTC UE 102 may receive a transmission comprising data 1008 via an MTC sub-band according to an identified MTC sub-band allocation for that MTC sub-band. The embodiments are not limited to these examples.

Figure 12:
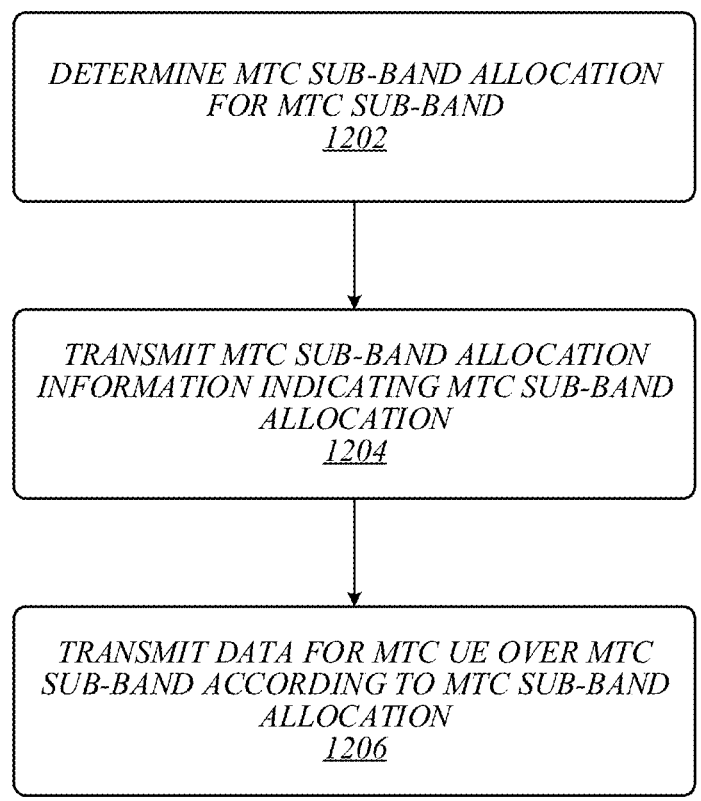
FIG. 12 illustrates an embodiment of a second logic flow.

FIG. 12 illustrates an example of a logic flow 1200 that may be representative of operations that may be performed in conjunction with the implementation of sub-band allocation techniques for reduced-bandwidth MTC devices in some embodiments. For example, logic flow 1200 may be representative of operations that may be performed in various embodiments by eNB 104 in operating environment 1000 of FIG. 10. As shown in FIG. 12, an MTC sub-band allocation for an MTC sub-band may be determined at 1202. In some embodiments, the MTC sub-band allocation may comprise an allocation of a plurality of subcarriers to an MTC sub-band of a system bandwidth, and may define at least one MTC DC subcarrier among that plurality of subcarriers. For example, in operating environment 1000 of FIG. 10, eNB 104 may determine an MTC sub-band allocation that comprises an allocation of a plurality of subcarriers to an MTC sub-band of its system bandwidth and defines at least one MTC DC subcarrier among that plurality of subcarriers. At 1204, MTC sub-band allocation information may be transmitted that indicates the MTC sub-band allocation. For example, in operating environment 1000 of FIG. 10, eNB 104 may transmit MTC sub-band allocation information 1006 that indicates an MTC sub-band allocation for an MTC sub-band within its system bandwidth. At 1206, data for an MTC UE may be transmitted over an MTC sub-band according to the MTC sub-band allocation. For example, in operating environment 1000 of FIG. 10, eNB 104 may generate a signal comprising data 1008 based on the MTC sub-band allocation for an MTC sub-band, and may transmit that signal to MTC UE 102 via the MTC sub-band. The embodiments are not limited to these examples.

FIG. 13A illustrates an embodiment of a storage medium 1300. Storage medium 1300 may comprise any non-transitory computer-readable storage medium or machine-readable storage medium, such as an optical, magnetic or semiconductor storage medium. In various embodiments, storage medium 1300 may comprise an article of manufacture. In some embodiments, storage medium 1300 may store computer-executable instructions for execution at an MTC UE. In various embodiments, storage medium 1300 may store computer-executable instructions to implement logic flow 1100 of FIG. 11. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 13B illustrates an embodiment of a storage medium 1350. Storage medium 1350 may comprise any non-transitory computer-readable storage medium or machine-readable storage medium, such as an optical, magnetic or semiconductor storage medium. In various embodiments, storage medium 1350 may comprise an article of manufacture. In some embodiments, storage medium 1350 may store computer-executable instructions for execution at an eNB. In various embodiments, storage medium 1350 may store computer-executable instructions to implement logic flow 1200 of FIG. 12. Examples of a computer-readable storage medium or machine-readable storage medium and of computer-readable instructions may include, without limitation, any of the respective examples previously mentioned in reference to storage medium 1300 of FIG. 13A. The embodiments are not limited in this context.

Figure 14:
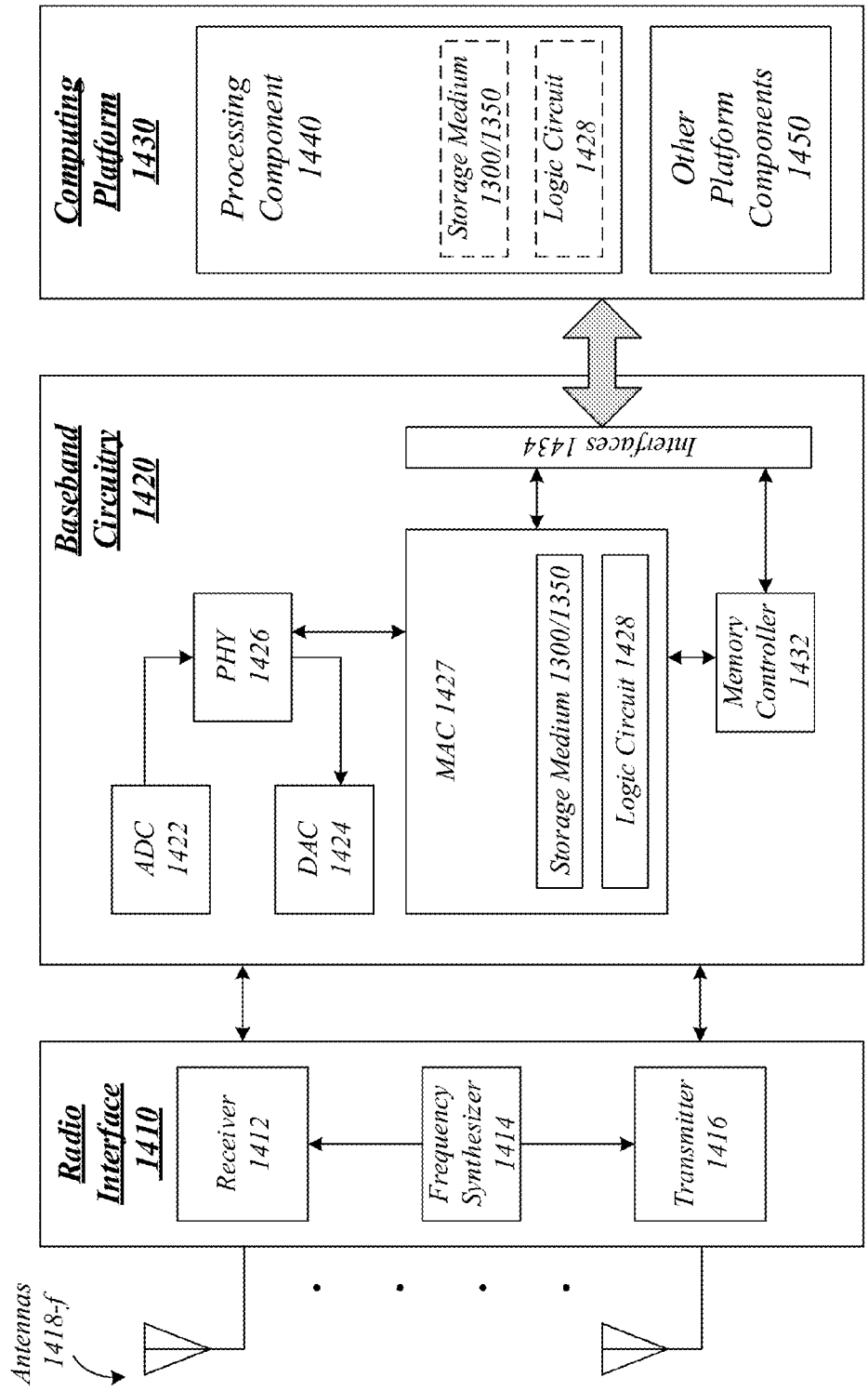
FIG. 14 illustrates an embodiment a device.

FIG. 14 illustrates an embodiment of a communications device 1400 that may implement one or more of MTC UE 102 and eNB 104 of FIGS. 1 and 10, logic flow 1100 of FIG. 11, logic flow 1200 of FIG. 12, storage medium 1300 of FIG. 13A, and storage medium 1350 of FIG. 13B. In various embodiments, device 1400 may comprise a logic circuit 1428. The logic circuit 1428 may include physical circuits to perform operations described for one or more of MTC UE 102 and eNB 104 of FIGS. 1 and 10, logic flow 1100 of FIG. 11, and logic flow 1200 of FIG. 12, for example. As shown in FIG. 14, device 1400 may include a radio interface 1410, baseband circuitry 1420, and computing platform 1430, although the embodiments are not limited to this configuration.

The device 1400 may implement some or all of the structure and/or operations for one or more of MTC UE 102 and eNB 104 of FIGS. 1 and 10, logic flow 1100 of FIG. 11, logic flow 1200 of FIG. 12, storage medium 1300 of FIG. 13A, storage medium 1350 of FIG. 13B, and logic circuit 1428 in a single computing entity, such as entirely within a single device. Alternatively, the device 1400 may distribute portions of the structure and/or operations for one or more of MTC UE 102 and eNB 104 of FIGS. 1 and 10, logic flow 1100 of FIG. 11, logic flow 1200 of FIG. 12, storage medium 1300 of FIG. 13A, storage medium 1350 of FIG. 13B, and logic circuit 1428 across multiple computing entities using a distributed system architecture, such as a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1410 may include, for example, a receiver 1412, a frequency synthesizer 1414, and/or a transmitter 1416. Radio interface 1410 may include bias controls, a crystal oscillator and/or one or more antennas 1418-f. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, a mixer for down-converting received radio frequency signals, an analog-to-digital converter 1422 for converting analog signals to a digital form, a digital-to-analog converter 1424 for converting digital signals to an analog form, and a mixer for up-converting signals for transmission. Further, baseband circuitry 1420 may include a baseband or physical layer (PHY) processing circuit 1426 for PHY link layer processing of respective receive/transmit signals. Baseband circuitry 1420 may include, for example, a medium access control (MAC) processing circuit 1427 for MAC/data link layer processing. Baseband circuitry 1420 may include a memory controller 1432 for communicating with MAC processing circuit 1427 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames. Alternatively or in addition, MAC processing circuit 1427 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for one or more of MTC UE 102 and eNB 104 of FIGS. 1 and 10, logic flow 1100 of FIG. 11, logic flow 1200 of FIG. 12, storage medium 1300 of FIG. 13A, storage medium 1350 of FIG. 13B, and logic circuit 1428 using the processing component 1440. The processing component 1440 (and/or PHY 1426 and/or MAC 1427) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired.

Embodiments of device 1400 may be implemented using single input single output (SISO) architectures. However, certain implementations may include multiple antennas (e.g., antennas 1418-*f*) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 15 illustrates an embodiment of a broadband wireless access system 1500. As shown in FIG. 15, broadband wireless access system 1500 may be an internet protocol (IP) type network comprising an internet 1510 type network or the like that is capable of supporting mobile wireless access and/or fixed wireless access to internet 1510. In one or more embodiments, broadband wireless access system 1500 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1500, radio access networks (RANs) 1512 and 1518 are capable of coupling with evolved node Bs (eNBs) 1514 and 1520, respectively, to provide wireless communication between one or more fixed devices 1516 and internet 1510 and/or between or one or more mobile devices 1522 and Internet 1510. One example of a fixed device 1516 and a mobile device 1522 is device 1400 of FIG. 14, with the fixed device 1516 comprising a stationary version of device 1400 and the mobile device 1522 comprising a mobile version of device 1400. RANs 1512 and 1518 may implement profiles that are capable of defining the mapping of network functions to one or more physical entities on broadband wireless access system 1500. eNBs 1514 and 1520 may comprise radio equipment to provide RF communication with fixed device 1516 and/or mobile device 1522, such as described with reference to device 1400, and may comprise, for example, the PHY and MAC layer equipment in compliance with a 3GPP LTE Specification or an IEEE 802.16 Standard. eNBs 1514 and 1520 may further comprise an IP backplane to couple to Internet 1510 via RANs 1512 and 1518, respectively, although the scope of the claimed subject matter is not limited in these respects.

Broadband wireless access system 1500 may further comprise a visited core network (CN) 1524 and/or a home CN 1526, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1524 and/or home CN 1526, and the scope of the claimed subject matter is not limited in these respects. Visited CN 1524 may be referred to as a visited CN in the case where visited CN 1524 is not part of the regular service provider of fixed device 1516 or mobile device 1522, for example where fixed device 1516 or mobile device 1522 is roaming away from its respective home CN 1526, or where broadband wireless access system 1500 is part of the regular service provider of fixed device 1516 or mobile device 1522 but where broadband wireless access system 1500 may be in another location or state that is not the main or home location of fixed device 1516 or mobile device 1522. The embodiments are not limited in this context.

Fixed device 1516 may be located anywhere within range of one or both of eNBs 1514 and 1520, such as in or near a home or business to provide home or business customer broadband access to Internet 1510 via eNBs 1514 and 1520 and RANs 1512 and 1518, respectively, and home CN 1526. It is worthy of note that although fixed device 1516 is generally disposed in a stationary location, it may be moved to different locations as needed. Mobile device 1522 may be utilized at one or more locations if mobile device 1522 is within range of one or both of eNBs 1514 and 1520, for example. In accordance with one or more embodiments, operation support system (OSS) 1528 may be part of broadband wireless access system 1500 to provide management functions for broadband wireless access system 1500 and to provide interfaces between functional entities of broadband wireless access system 1500. Broadband wireless access system 1500 of FIG. 15 is merely one type of wireless network showing a certain number of the components of broadband wireless access system 1500, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is user equipment (UE), comprising logic, at least a portion of which is in hardware, the logic to identify a machine-type communication (MTC) sub-band allocation based on received MTC sub-band allocation information, the MTC sub-band allocation to comprise an allocation of a plurality of subcarriers to an MTC sub-band of a system bandwidth of a serving cell of the UE, the MTC sub-band allocation to define at least one MTC direct current (DC) subcarrier among the plurality of subcarriers, and a radio interface to receive a transmission via the MTC sub-band according to the MTC sub-band allocation.

Example 2 is the UE of Example 1, the MTC sub-band allocation information to comprise a system bandwidth parameter identifying the system bandwidth, the logic to identify the MTC sub-band allocation based on the system bandwidth parameter.

Example 3 is the UE of Example 1, the MTC sub-band allocation to apply to one or more subframes, the logic to identify the one or more subframes based on the MTC sub-band allocation information.

Example 4 is the UE of Example 3, the MTC sub-band allocation information to comprise an MTC allocation duration parameter to indicate a duration of the MTC sub-band allocation, the logic to identify the one or more subframes based on the MTC allocation duration parameter.

Example 5 is the UE of Example 3, the MTC sub-band allocation information to comprise an MTC allocation subframe bitmap, the logic to identify the one or more subframes based on the MTC allocation subframe bitmap.

Example 6 is the UE of Example 1, the received MTC sub-band allocation information to be comprised in a received master information block (MIB).

Example 7 is the UE of Example 1, the received MTC sub-band allocation information to be comprised in a received system information block (SIB).

Example 8 is the UE of Example 1, the received MTC sub-band allocation information to be comprised in a received radio resource control (RRC) message.

Example 9 is the UE of Example 1, comprising a touchscreen display.

Example 10 is an evolved node B (eNB), comprising logic, at least a portion of which is in hardware, the logic to determine a machine-type communication (MTC) sub-band allocation comprising an allocation of a plurality of subcarriers to an MTC sub-band of a system bandwidth of the eNB, the MTC sub-band allocation to define one or more MTC direct current (DC) subcarriers among the plurality of subcarriers, and a radio interface to transmit a signal comprising MTC sub-band allocation information to indicate the MTC sub-band allocation.

Example 11 is the eNB of Example 10, the logic to generate an encoded bit stream comprising data for MTC user equipment (UE) and generate a modulated symbol stream based on the encoded bit stream, the radio interface to generate a second signal comprising the data for the MTC UE based on the modulated symbol stream and transmit the second signal.

Example 12 is the eNB of Example 11, the logic to generate a rate-matched encoded bit stream based on the encoded bit stream by applying rate-matching on the one or more MTC DC subcarriers and generate the modulated symbol stream based on the rate-matched encoded bit stream.

Example 13 is the eNB of Example 11, the logic to generate a stream of symbols based on the encoded bit stream and puncture the stream of symbols to obtain the modulated symbol stream by applying puncturing on the one or more MTC DC subcarriers.

Example 14 is the eNB of Example 10, the MTC sub-band allocation to comprise a predefined MTC sub-band allocation for the system bandwidth, the MTC sub-band allocation information to comprise a system bandwidth parameter to indicate the system bandwidth.

Example 15 is the eNB of Example 10, the MTC sub-band allocation information to indicate a duration of the MTC sub-band allocation.

Example 16 is the eNB of Example 10, the MTC sub-band allocation information to comprise an MTC allocation subframe bitmap to indicate one or more subframes to which the MTC sub-band allocation applies.

Example 17 is the eNB of Example 10, the MTC sub-band allocation to comprise a dynamically configured MTC sub-band allocation for a user equipment (UE).

Example 18 is at least one non-transitory computer-readable storage medium comprising a set of wireless communication instructions that, in response to being executed at an evolved node B (eNB), cause the eNB to assign a machine-type communication (MTC) sub-band to MTC user equipment (UE), send MTC sub-band allocation information to indicate an MTC sub-band allocation for the MTC sub-band, the MTC sub-band allocation to allocate a plurality of subcarriers to the MTC sub-band and define one or more MTC direct current (DC) subcarriers among the plurality of subcarriers, and send a message comprising data for the MTC UE over the assigned MTC sub-band.

Example 19 is the at least one non-transitory computer-readable storage medium of Example 18, comprising wireless communication instructions that, in response to being executed at the eNB, cause the eNB to select the assigned MTC sub-band from among a plurality of defined MTC sub-bands within a system bandwidth of the eNB.

Example 20 is the at least one non-transitory computer-readable storage medium of Example 19, at least one of the plurality of defined MTC sub-bands to overlap at least one other one of the plurality of defined MTC sub-bands.

Example 21 is the at least one non-transitory computer-readable storage medium of Example 19, at least one of the plurality of defined MTC sub-bands to comprise multiple MTC DC subcarriers.

Example 22 is the at least one non-transitory computer-readable storage medium of Example 19, at least one of the plurality of defined MTC sub-bands to overlap a DC subcarrier of the system bandwidth of the eNB.

Example 23 is the at least one non-transitory computer-readable storage medium of Example 19, comprising wireless communication instructions that, in response to being executed at the eNB, cause the eNB to dynamically configure the plurality of defined sub-bands.

Example 24 is the at least one non-transitory computer-readable storage medium of Example 18, the MTC sub-band allocation information to identify a starting frequency location for the assigned MTC sub-band.

Example 25 is the at least one non-transitory computer-readable storage medium of Example 18, comprising wireless communication instructions that, in response to being executed at the eNB, cause the eNB to determine a subsequent time at which to assign a second MTC sub-band to the MTC UE based on a minimum switching time for MTC sub-band assignments.

Example 26 is a wireless communication apparatus, comprising means for determining a machine-type communication (MTC) sub-band allocation comprising an allocation of a plurality of subcarriers to an MTC sub-band of a system bandwidth of an evolved node B (eNB), the MTC sub-band allocation to define one or more MTC direct current (DC) subcarriers among the plurality of subcarriers, and means for transmitting a signal comprising MTC sub-band allocation information to indicate the MTC sub-band allocation.

Example 27 is the wireless communication apparatus of Example 26, comprising means for generating an encoded bit stream comprising data for MTC user equipment (UE), means for generating a modulated symbol stream based on the encoded bit stream, means for generating a second signal comprising the data for the MTC UE based on the modulated symbol stream, and means for transmitting the second signal.

Example 28 is the wireless communication apparatus of Example 27, comprising means for generating a rate-matched encoded bit stream based on the encoded bit stream by applying rate-matching on the one or more MTC DC subcarriers, and means for generating the modulated symbol stream based on the rate-matched encoded bit stream.

Example 29 is the wireless communication apparatus of Example 27, comprising means for generating a stream of symbols based on the encoded bit stream, and means for puncturing the stream of symbols to obtain the modulated symbol stream by applying puncturing on the one or more MTC DC subcarriers.

Example 30 is the wireless communication apparatus of Example 26, the MTC sub-band allocation to comprise a predefined MTC sub-band allocation for the system bandwidth, the MTC sub-band allocation information to comprise a system bandwidth parameter to indicate the system bandwidth.

Example 31 is the wireless communication apparatus of Example 26, the MTC sub-band allocation information to indicate a duration of the MTC sub-band allocation.

Example 32 is the wireless communication apparatus of Example 26, the MTC sub-band allocation information to comprise an MTC allocation subframe bitmap to indicate one or more subframes to which the MTC sub-band allocation applies.

Example 33 is the wireless communication apparatus of Example 26, the MTC sub-band allocation to comprise a dynamically configured MTC sub-band allocation for a user equipment (UE).

Example 34 is a system, comprising a wireless communication apparatus according to any of Examples 26 to 33, at least one radio frequency (RF) transceiver, and at least one RF antenna.

Example 35 is a wireless communication method, comprising assigning, by processing circuitry at an evolved node B (eNB), a machine-type communication (MTC) sub-band to MTC user equipment (UE), sending MTC sub-band allocation information to indicate an MTC sub-band allocation for the MTC sub-band, the MTC sub-band allocation to allocate a plurality of subcarriers to the MTC sub-band and define one or more MTC direct current (DC) subcarriers among the plurality of subcarriers, and sending a message comprising data for the MTC UE over the assigned MTC sub-band.

Example 36 is the wireless communication method of Example 35, comprising selecting the assigned MTC sub-band from among a plurality of defined MTC sub-bands within a system bandwidth of the eNB.

Example 37 is the wireless communication method of Example 36, at least one of the plurality of defined MTC sub-bands to overlap at least one other one of the plurality of defined MTC sub-bands.

Example 38 is the wireless communication method of Example 36, at least one of the plurality of defined MTC sub-bands to comprise multiple MTC DC subcarriers.

Example 39 is the wireless communication method of Example 36, at least one of the plurality of defined MTC sub-bands to overlap a DC subcarrier of the system bandwidth of the eNB.

Example 40 is the wireless communication method of Example 36, comprising dynamically configuring the plurality of defined sub-bands.

Example 41 is the wireless communication method of Example 35, the MTC sub-band allocation information to identify a starting frequency location for the assigned MTC sub-band.

Example 42 is the wireless communication method of Example 35, comprising determining a subsequent time at which to assign a second MTC sub-band to the MTC UE based on a minimum switching time for MTC sub-band assignments.

Example 43 is at least one non-transitory computer-readable storage medium comprising a set of instructions that, in response to being executed on a computing device, cause the computing device to perform a wireless communication method according to any of Examples 35 to 42.

Example 44 is an apparatus, comprising means for performing a wireless communication method according to any of Examples 35 to 42.

Example 45 is a system, comprising the apparatus of Example 44, at least one radio frequency (RF) transceiver, and at least one RF antenna.

Example 46 is at least one non-transitory computer-readable storage medium comprising a set of wireless communication instructions that, in response to being executed at user equipment (UE), cause the UE to identify a machine-type communication (MTC) sub-band allocation based on received MTC sub-band allocation information, the MTC sub-band allocation to comprise an allocation of a plurality of subcarriers to an MTC sub-band of a system bandwidth of a serving cell of the UE, the MTC sub-band allocation to define at least one MTC direct current (DC) subcarrier among the plurality of subcarriers, and receive a transmission via the MTC sub-band according to the MTC sub-band allocation.

Example 47 is the at least one non-transitory computer-readable storage medium of Example 46, comprising wireless communication instructions that, in response to being executed at the UE, cause the UE to identify the MTC sub-band allocation based on a system bandwidth parameter comprised in the MTC sub-band allocation information, the system bandwidth parameter to identify the system bandwidth.

Example 48 is the at least one non-transitory computer-readable storage medium of Example 46, comprising wireless communication instructions that, in response to being executed at the UE, cause the UE to identify one or more subframes to which the MTC sub-band allocation is to apply based on the MTC sub-band allocation information.

Example 49 is the at least one non-transitory computer-readable storage medium of Example 48, comprising wireless communication instructions that, in response to being executed at the UE, cause the UE to identify the one or more subframes based on an MTC allocation duration parameter comprised in the MTC sub-band allocation information, the MTC allocation duration parameter to indicate a duration of the MTC sub-band allocation.

Example 50 is the at least one non-transitory computer-readable storage medium of Example 48, comprising wireless communication instructions that, in response to being executed at the UE, cause the UE to identify the one or more subframes based on an MTC allocation subframe bitmap comprised in the MTC sub-band allocation information.

Example 51 is the at least one non-transitory computer-readable storage medium of Example 46, the received MTC sub-band allocation information to be comprised in a received master information block (MIB).

Example 52 is the at least one non-transitory computer-readable storage medium of Example 46, the received MTC sub-band allocation information to be comprised in a received system information block (SIB).

Example 53 is the at least one non-transitory computer-readable storage medium of Example 46, the received MTC sub-band allocation information to be comprised in a received radio resource control (RRC) message.

Example 54 is a wireless communication apparatus, comprising means for assigning a machine-type communication (MTC) sub-band to MTC user equipment (UE), means for sending MTC sub-band allocation information to indicate an MTC sub-band allocation for the MTC sub-band, the MTC sub-band allocation to allocate a plurality of subcarriers to the MTC sub-band and define one or more MTC direct current (DC) subcarriers among the plurality of subcarriers, and means for sending a message comprising data for the MTC UE over the assigned MTC sub-band.

Example 55 is the wireless communication apparatus of Example 54, comprising means for selecting the assigned MTC sub-band from among a plurality of defined MTC sub-bands within a system bandwidth of an evolved node B (eNB).

Example 56 is the wireless communication apparatus of Example 55, at least one of the plurality of defined MTC sub-bands to overlap at least one other one of the plurality of defined MTC sub-bands.

Example 57 is the wireless communication apparatus of Example 55, at least one of the plurality of defined MTC sub-bands to comprise multiple MTC DC subcarriers.

Example 58 is the wireless communication apparatus of Example 55, at least one of the plurality of defined MTC sub-bands to overlap a DC subcarrier of the system bandwidth of the eNB.

Example 59 is the wireless communication apparatus of Example 55, comprising means for dynamically configuring the plurality of defined sub-bands.

Example 60 is the wireless communication apparatus of Example 54, the MTC sub-band allocation information to identify a starting frequency location for the assigned MTC sub-band.

Example 61 is the wireless communication apparatus of Example 54, comprising means for determining a subsequent time at which to assign a second MTC sub-band to the MTC UE based on a minimum switching time for MTC sub-band assignments.

Example 62 is a system, comprising a wireless communication apparatus according to any of Examples 54 to 61, at least one radio frequency (RF) transceiver, and at least one RF antenna.

Example 63 is a wireless communication method, comprising identifying, by processing circuitry at user equipment (UE), a machine-type communication (MTC) sub-band allocation based on received MTC sub-band allocation information, the MTC sub-band allocation to comprise an allocation of a plurality of subcarriers to an MTC sub-band of a system bandwidth of a serving cell of the UE, the MTC sub-band allocation to define at least one MTC direct current (DC) subcarrier among the plurality of subcarriers, and receiving a transmission via the MTC sub-band according to the MTC sub-band allocation.

Example 64 is the wireless communication method of Example 63, comprising identifying the MTC sub-band allocation based on a system bandwidth parameter comprised in the MTC sub-band allocation information, the system bandwidth parameter to identify the system bandwidth.

Example 65 is the wireless communication method of Example 63, comprising identifying one or more subframes to which the MTC sub-band allocation is to apply based on the MTC sub-band allocation information.

Example 66 is the wireless communication method of Example 65, comprising identifying the one or more subframes based on an MTC allocation duration parameter comprised in the MTC sub-band allocation information, the MTC allocation duration parameter to indicate a duration of the MTC sub-band allocation.

Example 67 is the wireless communication method of Example 65, comprising identifying the one or more subframes based on an MTC allocation subframe bitmap comprised in the MTC sub-band allocation information.

Example 68 is the wireless communication method of Example 63, the received MTC sub-band allocation information to be comprised in a received master information block (MIB).

Example 69 is the wireless communication method of Example 63, the received MTC sub-band allocation information to be comprised in a received system information block (SIB).

Example 70 is the wireless communication method of Example 63, the received MTC sub-band allocation information to be comprised in a received radio resource control (RRC) message.

Example 71 is at least one non-transitory computer-readable storage medium comprising a set of instructions that, in response to being executed on a computing device, cause the computing device to perform a wireless communication method according to any of Examples 63 to 70.

Example 72 is an apparatus, comprising means for performing a wireless communication method according to any of Examples 63 to 70.

Example 73 is a system, comprising the apparatus of Example 72, at least one radio frequency (RF) transceiver, and at least one RF antenna.

Example 74 is the system of Example 73, comprising a touchscreen display.

Example 75 is at least one non-transitory computer-readable storage medium comprising a set of wireless communication instructions that, in response to being executed at an evolved node B (eNB), cause the eNB to determine a machine-type communication (MTC) sub-band allocation comprising an allocation of a plurality of subcarriers to an MTC sub-band of a system bandwidth of the eNB, the MTC sub-band allocation to define one or more MTC direct current (DC) subcarriers among the plurality of subcarriers, and transmit a signal comprising MTC sub-band allocation information to indicate the MTC sub-band allocation.

Example 76 is the at least one non-transitory computer-readable storage medium of Example 75, comprising wireless communication instructions that, in response to being executed at the eNB, cause the eNB to generate an encoded bit stream comprising data for MTC user equipment (UE), generate a modulated symbol stream based on the encoded bit stream, generate a second signal comprising the data for the MTC UE based on the modulated symbol stream, and transmit the second signal.

Example 77 is the at least one non-transitory computer-readable storage medium of Example 76, comprising wireless communication instructions that, in response to being executed at the eNB, cause the eNB to generate a rate-matched encoded bit stream based on the encoded bit stream by applying rate-matching on the one or more MTC DC subcarriers, and generate the modulated symbol stream based on the rate-matched encoded bit stream.

Example 78 is the at least one non-transitory computer-readable storage medium of Example 76, comprising wireless communication instructions that, in response to being executed at the eNB, cause the eNB to generate a stream of symbols based on the encoded bit stream, and puncture the stream of symbols to obtain the modulated symbol stream by applying puncturing on the one or more MTC DC subcarriers.

Example 79 is the at least one non-transitory computer-readable storage medium of Example 75, the MTC sub-band allocation to comprise a predefined MTC sub-band allocation for the system bandwidth, the MTC sub-band allocation information to comprise a system bandwidth parameter to indicate the system bandwidth.

Example 80 is the at least one non-transitory computer-readable storage medium of Example 75, the MTC sub-band allocation information to indicate a duration of the MTC sub-band allocation.

Example 81 is the at least one non-transitory computer-readable storage medium of Example 75, the MTC sub-band allocation information to comprise an MTC allocation subframe bitmap to indicate one or more subframes to which the MTC sub-band allocation applies.

Example 82 is the at least one non-transitory computer-readable storage medium of Example 75, the MTC sub-band allocation to comprise a dynamically configured MTC sub-band allocation for a user equipment (UE).

Example 83 is a wireless communication apparatus, comprising means for identifying a machine-type communication (MTC) sub-band allocation based on received MTC sub-band allocation information, the MTC sub-band allocation to comprise an allocation of a plurality of subcarriers to an MTC sub-band of a system bandwidth of a serving cell of user equipment (UE), the MTC sub-band allocation to define at least one MTC direct current (DC) subcarrier among the plurality of subcarriers, and means for receiving a transmission via the MTC sub-band according to the MTC sub-band allocation.

Example 84 is the wireless communication apparatus of Example 83, comprising means for identifying the MTC sub-band allocation based on a system bandwidth parameter comprised in the MTC sub-band allocation information, the system bandwidth parameter to identify the system bandwidth.

Example 85 is the wireless communication apparatus of Example 83, comprising means for identifying one or more subframes to which the MTC sub-band allocation is to apply based on the MTC sub-band allocation information.

Example 86 is the wireless communication apparatus of Example 85, comprising means for identifying the one or more subframes based on an MTC allocation duration parameter comprised in the MTC sub-band allocation information, the MTC allocation duration parameter to indicate a duration of the MTC sub-band allocation.

Example 87 is the wireless communication apparatus of Example 85, comprising means for identifying the one or more subframes based on an MTC allocation subframe bitmap comprised in the MTC sub-band allocation information.

Example 88 is the wireless communication apparatus of Example 83, the received MTC sub-band allocation information to be comprised in a received master information block (MIB).

Example 89 is the wireless communication apparatus of Example 83, the received MTC sub-band allocation information to be comprised in a received system information block (SIB).

Example 90 is the wireless communication apparatus of Example 83, the received MTC sub-band allocation information to be comprised in a received radio resource control (RRC) message.

Example 91 is a system, comprising a wireless communication apparatus according to any of Examples 83 to 90, at least one radio frequency (RF) transceiver, and at least one RF antenna.

Example 92 is the system of Example 91, comprising a touchscreen display.

Example 93 is a wireless communication method, comprising determining, by processing circuitry at an evolved node B (eNB), a machine-type communication (MTC) sub-band allocation comprising an allocation of a plurality of subcarriers to an MTC sub-band of a system bandwidth of the eNB, the MTC sub-band allocation to define one or more MTC direct current (DC) subcarriers among the plurality of subcarriers, and transmitting a signal comprising MTC sub-band allocation information to indicate the MTC sub-band allocation.

Example 94 is the wireless communication method of Example 93, comprising generating an encoded bit stream comprising data for MTC user equipment (UE), generating a modulated symbol stream based on the encoded bit stream, generating a second signal comprising the data for the MTC UE based on the modulated symbol stream, and transmitting the second signal.

Example 95 is the wireless communication method of Example 94, comprising generating a rate-matched encoded bit stream based on the encoded bit stream by applying rate-matching on the one or more MTC DC subcarriers, and generating the modulated symbol stream based on the rate-matched encoded bit stream.

Example 96 is the wireless communication method of Example 94, comprising generating a stream of symbols based on the encoded bit stream, and puncturing the stream of symbols to obtain the modulated symbol stream by applying puncturing on the one or more MTC DC subcarriers.

Example 97 is the wireless communication method of Example 93, the MTC sub-band allocation to comprise a predefined MTC sub-band allocation for the system bandwidth, the MTC sub-band allocation information to comprise a system bandwidth parameter to indicate the system bandwidth.

Example 98 is the wireless communication method of Example 93, the MTC sub-band allocation information to indicate a duration of the MTC sub-band allocation.

Example 99 is the wireless communication method of Example 93, the MTC sub-band allocation information to comprise an MTC allocation subframe bitmap to indicate one or more subframes to which the MTC sub-band allocation applies.

Example 100 is the wireless communication method of Example 93, the MTC sub-band allocation to comprise a dynamically configured MTC sub-band allocation for a user equipment (UE).

Example 101 is at least one non-transitory computer-readable storage medium comprising a set of instructions that, in response to being executed on a computing device, cause the computing device to perform a wireless communication method according to any of Examples 93 to 100.

Example 102 is an apparatus, comprising means for performing a wireless communication method according to any of Examples 93 to 100.

Example 103 is a system, comprising the apparatus of Example 102, at least one radio frequency (RF) transceiver, and at least one RF antenna.

Example 104 is an evolved node B (eNB), comprising logic, at least a portion of which is in hardware, the logic to assign a machine-type communication (MTC) sub-band to MTC user equipment (UE), send MTC sub-band allocation information to indicate an MTC sub-band allocation for the MTC sub-band, the MTC sub-band allocation to allocate a plurality of subcarriers to the MTC sub-band and define one or more MTC direct current (DC) subcarriers among the plurality of subcarriers, the logic to send a message comprising data for the MTC UE over the assigned MTC sub-band.

Example 105 is the eNB of Example 104, the logic to select the assigned MTC sub-band from among a plurality of defined MTC sub-bands within a system bandwidth of the eNB.

Example 106 is the eNB of Example 105, at least one of the plurality of defined MTC sub-bands to overlap at least one other one of the plurality of defined MTC sub-bands.

Example 107 is the eNB of Example 105, at least one of the plurality of defined MTC sub-bands to comprise multiple MTC DC subcarriers.

Example 108 is the eNB of Example 105, at least one of the plurality of defined MTC sub-bands to overlap a DC subcarrier of the system bandwidth of the eNB.

Example 109 is the eNB of Example 105, the logic to dynamically configure the plurality of defined sub-bands.

Example 110 is the eNB 104, the MTC sub-band allocation information to identify a starting frequency location for the assigned MTC sub-band.

Example 111 is the eNB of Example 104, the logic to determine a subsequent time at which to assign a second MTC sub-band to the MTC UE based on a minimum switching time for MTC sub-band assignments.

Example 112 is the eNB of any of Examples 104 to 111, comprising at least one radio frequency (RF) transceiver, and at least one RF antenna.

Example 113 is user equipment (UE), comprising logic, at least a portion of which is in hardware, the logic to identify a machine-type communication (MTC) sub-band allocation based on received MTC sub-band allocation information independently for both downlink (DL) and uplink (UL), the MTC sub-band allocation to comprise an allocation of a plurality of subcarriers to an MTC sub-band of a system bandwidth of a serving cell of the UE independently for both downlink (DL) and uplink (UL), the MTC sub-band allocation to define at least one MTC direct current (DC) subcarrier among the plurality of subcarriers for downlink (DL), and a radio interface to receive a transmission via the MTC sub-band according to the MTC sub-band allocation.

Example 114 is the UE of Example 113, the MTC sub-band allocation information to comprise a system bandwidth parameter identifying the system bandwidth, the logic to identify the MTC sub-band allocation based on the system bandwidth parameter.

Example 115 is the UE of Example 113, the MTC sub-band allocation to apply to one or more subframes, the logic to identify the one or more subframes based on the MTC sub-band allocation information.

Example 116 is the UE of Example 115, the MTC sub-band allocation information to comprise an MTC allocation duration parameter to indicate a duration of the MTC sub-band allocation, the logic to identify the one or more subframes based on the MTC allocation duration parameter.

Example 117 is the UE of Example 115, the MTC sub-band allocation information to comprise an MTC allocation subframe bitmap, the logic to identify the one or more subframes based on the MTC allocation subframe bitmap.

Example 118 is the UE of Example 113, the received MTC sub-band allocation information comprised in a received master information block (MIB).

Example 119 is the UE of Example 113, the received MTC sub-band allocation information comprised in a received system information block (SIB).

Example 120 is the UE of Example 119, wherein the received system information block (SIB) is a new SIB defined for MTC UEs in addition to or to replace one more legacy SIB s.

Example 121 is the UE of Example 113, the received MTC sub-band allocation information comprised in a received radio resource control (RRC) message.

Example 122 is the UE of Example 113, comprising a touchscreen display.

Example 123 is an evolved node B (eNB), comprising logic, at least a portion of which is in hardware, the logic to determine a machine-type communication (MTC) sub-band allocation comprising an allocation of a plurality of subcarriers to an MTC sub-band of a system bandwidth of the eNB independently for both downlink (DL) and uplink (UL), the MTC sub-band allocation to define one or more MTC direct current (DC) subcarriers among the plurality of subcarriers for downlink (DL), and a radio interface to transmit a signal comprising MTC sub-band allocation information to indicate the MTC sub-band allocation.

Example 124 is the eNB of Example 123, the logic to generate an encoded bit stream comprising data for MTC user equipment (UE) and generate a modulated symbol stream based on the encoded bit stream, the radio interface to generate a second signal comprising the data for the MTC UE based on the modulated symbol stream and transmit the second signal.

Example 125 is the eNB of Example 124, the logic to generate a rate-matched encoded bit stream based on the encoded bit stream by applying rate-matching on the one or more MTC DC subcarriers and generate the modulated symbol stream based on the rate-matched encoded bit stream.

Example 126 is the eNB of Example 124, the logic to generate a stream of symbols based on the encoded bit stream and puncture the stream of symbols to obtain the modulated symbol stream by applying puncturing on the one or more MTC DC subcarriers.

Example 127 is the eNB of Example 123, the MTC sub-band allocation to comprise a predefined MTC sub-band allocation for the system bandwidth, the MTC sub-band allocation information comprising a system bandwidth parameter to indicate the system bandwidth.

Example 128 is the eNB of Example 123, the MTC sub-band allocation information to indicate a duration of the MTC sub-band allocation.

Example 129 is the eNB of Example 123, the MTC sub-band allocation information to comprise an MTC allocation subframe bitmap to indicate one or more subframes to which the MTC sub-band allocation applies.

Example 130 is the eNB of Example 123, the MTC sub-band allocation to comprise a dynamically configured MTC sub-band allocation for a user equipment (UE).

Example 131 is at least one non-transitory computer-readable storage medium comprising a set of instructions that, in response to being executed at an evolved node B (eNB), cause the eNB to assign a machine-type communication (MTC) sub-band to MTC user equipment (UE) independently for both downlink (DL) and uplink (UL), send MTC sub-band allocation information to indicate an MTC sub-band allocation for the MTC sub-band, the MTC sub-band allocation to allocate a plurality of subcarriers to the MTC sub-band and define one or more MTC direct current (DC) subcarriers among the plurality of subcarriers, send a message comprising data or physical signals for the MTC UE over the assigned MTC sub-band on the downlink (DL), and receive a message comprising data or physical signals from the MTC UE over the assigned MTC sub-band on the uplink (UL).

Example 132 is the at least one non-transitory computer-readable storage medium of Example 131, comprising instructions that, in response to being executed at the eNB, cause the eNB to select the assigned MTC sub-band from among a plurality of defined MTC sub-bands within a system bandwidth of the eNB.

Example 133 is the at least one non-transitory computer-readable storage medium of Example 132, at least one of the plurality of defined MTC sub-bands to overlap at least one other one of the plurality of defined MTC sub-bands.

Example 134 is the at least one non-transitory computer-readable storage medium of Example 132, at least one of the plurality of defined MTC sub-bands to comprise multiple MTC DC subcarriers.

Example 135 is the at least one non-transitory computer-readable storage medium of Example 132, at least one of the plurality of defined MTC sub-bands to overlap a DC sub-carrier of the system bandwidth of the eNB.

Example 136 is the at least one non-transitory computer-readable storage medium of Example 132, comprising instructions that, in response to being executed at the eNB, cause the eNB to dynamically configure the plurality of defined sub-bands.

Example 137 is the at least one non-transitory computer-readable storage medium of Example 131, comprising instructions that, in response to being executed at the eNB, cause the eNB to configure one or a plurality of sub-bands in a UE-specific manner using dedicated RRC signaling or Layer 1 signaling.

Example 138 is the at least one non-transitory computer-readable storage medium of Example 131, the MTC sub-band allocation information to identify a starting frequency location for the assigned MTC sub-band.

Example 139 is the at least one non-transitory computer-readable storage medium of Example 131, comprising instructions that, in response to being executed at the eNB, cause the eNB to determine a subsequent time at which to assign a second MTC sub-band to the MTC UE based on a minimum switching time for MTC sub-band assignments.

Example 140 is the at least one non-transitory computer-readable storage medium of Example 139, wherein the switching time from one MTC sub-band to another within the system bandwidth does not occur before one or a plurality of subframes or radio frames.

Example 141 is the at least one non-transitory computer-readable storage medium of Example 139, wherein the switching time is pre-defined or indicated via higher layer signaling or indicated via dynamic signaling.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
   logic, at least a portion of which is in hardware, the logic to identify a machine-type communication (MTC) sub-band allocation based on received MTC sub-band allocation information, the MTC sub-band allocation to comprise an allocation of a plurality of subcarriers to an MTC sub-band of a system bandwidth of a serving cell of the UE, the MTC sub-band allocation to define multiple MTC direct current (DC) subcarriers among the plurality of subcarriers in the MTC sub-band, the MTC sub-band allocation to apply to one or more subframes, wherein for each of the one or more subframes, the definition of the multiple MTC subcarriers applies only during orthogonal frequency-division multiplexing (OFDM) symbols following a control region of that subframe, the MTC sub-band allocation information to comprise an MTC allocation duration parameter to indicate a duration of the MTC sub-band allocation, the logic to identify the one or more subframes based on the MTC allocation duration parameter; and
a radio interface to receive a transmission via the MTC sub-band according to the MTC sub-band allocation.

2. The UE of claim 1, the MTC sub-band allocation information to comprise a system bandwidth parameter identifying the system bandwidth, the logic to identify the MTC sub-band allocation based on the system bandwidth parameter.

3. The UE of claim 1, the logic to identify the one or more subframes based on the MTC sub-band allocation information.

4. The UE of claim 1, the MTC sub-band allocation information to comprise an MTC allocation subframe bitmap, the logic to identify the one or more subframes based on the MTC allocation subframe bitmap.

5. The UE of claim 1, the received MTC sub-band allocation information to be comprised in a received master information block (MIB).

6. The UE of claim 1, the received MTC sub-band allocation information to be comprised in a received system information block (SIB).

7. The UE of claim 1, the received MTC sub-band allocation information to be comprised in a received radio resource control (RRC) message.

8. The UE of claim 1, comprising a touchscreen display.

9. An evolved node B (eNB), comprising:
logic, at least a portion of which is in hardware, the logic to determine a machine-type communication (MTC) sub-band allocation comprising an allocation of a plurality of subcarriers to an MTC sub-band of a system bandwidth of the eNB, the MTC sub-band allocation to define multiple MTC direct current (DC) subcarriers among the plurality of subcarriers in the MTC sub-band, the MTC sub-band allocation to apply to one or more subframes, wherein for each of the one or more subframes, the definition of the multiple MTC subcarriers applies only during orthogonal frequency-division multiplexing (OFDM) symbols following a control region of that subframe, the MTC sub-band allocation information to indicate a duration of the MTC sub-band allocation; and
a radio interface to transmit a signal comprising MTC sub-band allocation information to indicate the MTC sub-band allocation.

10. The eNB of claim 9, the logic to generate an encoded bit stream comprising data for MTC user equipment (UE) and generate a modulated symbol stream based on the encoded bit stream, the radio interface to generate a second signal comprising the data for the MTC UE based on the modulated symbol stream and transmit the second signal.

11. The eNB of claim 10, the logic to generate a rate-matched encoded bit stream based on the encoded bit stream by applying rate-matching on the one or more MTC DC subcarriers and generate the modulated symbol stream based on the rate-matched encoded bit stream.

12. The eNB of claim 10, the logic to generate a stream of symbols based on the encoded bit stream and puncture the stream of symbols to obtain the modulated symbol stream by applying puncturing on the one or more MTC DC subcarriers.

13. The eNB of claim 9, the MTC sub-band allocation to comprise a predefined MTC sub-band allocation for the system bandwidth, the MTC sub-band allocation information to comprise a system bandwidth parameter to indicate the system bandwidth.

14. The eNB of claim 9, the MTC sub-band allocation information to comprise an MTC allocation subframe bitmap to indicate the one or more subframes to which the MTC sub-band allocation applies.

15. The eNB of claim 9, the MTC sub-band allocation to comprise a dynamically configured MTC sub-band allocation for a user equipment (UE).

16. At least one non-transitory computer-readable storage medium comprising a set of instructions that, in response to being executed at an evolved node B (eNB), cause the eNB to:
assign a machine-type communication (MTC) sub-band to MTC user equipment (UE);
send MTC sub-band allocation information to indicate an MTC sub-band allocation for the MTC sub-band, the MTC sub-band allocation to allocate a plurality of subcarriers to the MTC sub-band and define multiple MTC direct current (DC) subcarriers among the plurality of subcarriers in the MTC sub-band, the MTC sub-band allocation to apply to one or more subframes, wherein for each of the one or more subframes, the definition of the multiple MTC subcarriers applies only during orthogonal frequency-division multiplexing (OFDM) symbols following a control region of that subframe, the MTC sub-band allocation information to comprise an MTC allocation duration parameter to indicate a duration of the MTC sub-band allocation; and
send a message comprising data for the MTC UE over the assigned MTC sub-band.

17. The at least one non-transitory computer-readable storage medium of claim 16, comprising instructions that, in response to being executed at the eNB, cause the eNB to select the assigned MTC sub-band from among a plurality of defined MTC sub-bands within a system bandwidth of the eNB.

18. The at least one non-transitory computer-readable storage medium of claim 17, at least one of the plurality of defined MTC sub-bands to overlap at least one other one of the plurality of defined MTC sub-bands.

19. The at least one non-transitory computer-readable storage medium of claim 17, at least one of the plurality of defined MTC sub-bands to overlap a DC subcarrier of the system bandwidth of the eNB.

20. The at least one non-transitory computer-readable storage medium of claim 17, comprising instructions that, in response to being executed at the eNB, cause the eNB to dynamically configure the plurality of defined sub-bands.

21. The at least one non-transitory computer-readable storage medium of claim 16, the MTC sub-band allocation information to identify a starting frequency location for the assigned MTC sub-band.

22. The at least one non-transitory computer-readable storage medium of claim 16, comprising instructions that, in response to being executed at the eNB, cause the eNB to determine a subsequent time at which to assign a second MTC sub-band to the MTC UE based on a minimum switching time for MTC sub-band assignments.

* * * * *